United States Patent
Birch et al.

(10) Patent No.: US 7,413,759 B2
(45) Date of Patent: *Aug. 19, 2008

(54) METHOD OF ENHANCING COGNITIVE ABILITY IN INFANT FED DHA CONTAINING BABY-FOOD COMPOSITIONS

(75) Inventors: Eileen E. Birch, Dallas, TX (US); Mary Beth Cool, Canajoharie, NY (US); Robert A. Harvey, St. Johnsville, NY (US); Dennis R. Hoffman, Dallas, TX (US); Terry L. Rocklin, Fort Plain, NY (US); Virginia A. San Fanandre, Canajoharie, NY (US); Gerald E. Shaul, Canajoharie, NY (US); Richard C. Theuer, Raleigh, NC (US)

(73) Assignee: Beech-Nut Nutrition Corporation, St. Louis, MO (US)

( * ) Notice: Subject to any disclaimer, the term of this patent is extended or adjusted under 35 U.S.C. 154(b) by 330 days.

This patent is subject to a terminal disclaimer.

(21) Appl. No.: 10/970,608

(22) Filed: Oct. 21, 2004

(65) Prior Publication Data

US 2005/0053713 A1    Mar. 10, 2005

Related U.S. Application Data

(63) Continuation-in-part of application No. 10/702,760, filed on Nov. 6, 2003, now Pat. No. 7,141,266, which is a continuation-in-part of application No. 10/460,687, filed on Jun. 12, 2003, now abandoned, which is a continuation of application No. 09/716,518, filed on Nov. 20, 2000, now Pat. No. 6,579,551, which is a continuation-in-part of application No. 09/082,634, filed on May 21, 1998, now Pat. No. 6,149,964.

(51) Int. Cl.
*A23L 1/32* (2006.01)

(52) U.S. Cl. .............. 426/614; 426/801; 514/560; 514/912; 424/195.17

(58) Field of Classification Search ............... 426/614, 426/801; 514/912
See application file for complete search history.

(56) References Cited

U.S. PATENT DOCUMENTS

| | | | |
|---|---|---|---|
| 3,723,407 A | 3/1973 | Miller et al. | |
| 4,013,799 A * | 3/1977 | Smalligan et al. | 426/578 |
| 4,401,683 A | 8/1983 | Thompson | |
| 4,607,052 A | 8/1986 | Mendy et al. | |
| 4,670,285 A | 6/1987 | Clandinin et al. | |
| 4,758,592 A | 7/1988 | Horrobin et al. | |
| 4,776,984 A | 10/1988 | Traitler et al. | |
| 4,795,650 A | 1/1989 | Groobert | |
| 4,918,063 A | 4/1990 | Lichtenberger | |
| 4,977,187 A | 12/1990 | Horrobin | |
| 5,053,387 A | 10/1991 | Alexander | |
| 5,120,760 A | 6/1992 | Horrobin | |
| 5,130,449 A | 7/1992 | Lagarde et al. | |
| 5,134,129 A | 7/1992 | Lichtenberger | |
| 5,158,975 A | 10/1992 | Guichardant et al. | |
| 5,178,873 A | 1/1993 | Horrobin et al. | |
| 5,215,746 A | 6/1993 | Stolle et al. | |
| 5,221,668 A | 6/1993 | Henningfield et al. | |
| 5,223,285 A | 6/1993 | DeMichele et al. | |
| 5,234,702 A | 8/1993 | Katz et al. | |
| 5,246,717 A | 9/1993 | Garwin | |
| 5,248,515 A | 9/1993 | Payton et al. | |
| 5,290,573 A | 3/1994 | Holub | |
| 5,308,832 A | 5/1994 | Garleb et al. | |
| 5,340,594 A | 8/1994 | Barclay | |
| 5,397,591 A | 3/1995 | Kyle et al. | |
| 5,403,826 A | 4/1995 | Cope et al. | |
| 5,407,957 A | 4/1995 | Kyle et al. | |
| 5,415,879 A | 5/1995 | Oh | |

(Continued)

FOREIGN PATENT DOCUMENTS

EP         231904         8/1987

(Continued)

OTHER PUBLICATIONS

Lanting et al. Lipids in Infant Nutrition and Their IMpace on Later Development. Current Opinion in Lipidology. 1996, 7:43-47.*

(Continued)

*Primary Examiner*—Anthony Weier
(74) *Attorney, Agent, or Firm*—Sonnenschein, Nath & Rosenthal, LLP

(57) ABSTRACT

Methods for enhancing cognitive ability in infants are shown. The methods comprise feeding infants baby-food compositions containing docosahexaenoic acid (DHA) in an amount of at least about 0.5 mg per gram of the composition. Infants fed a composition containing DHA from an age of about 6 months to about one year exhibit improved problem solving ability compared to infants fed a composition containing DHA in an amount less than about 5 mg per 100 grams total composition over the same period. The source of the DHA can be DHA-enriched coagulated egg yolk solids present in an amount of from about 5% to about 25% (grams/100 grams). Also shown are methods of making the DHA-enriched baby-food compositions, and methods of providing the compositions to a consumer.

43 Claims, No Drawings

U.S. PATENT DOCUMENTS

| | | | |
|---|---|---|---|
| 5,445,822 | A | 8/1995 | Bracco |
| 5,457,130 | A | 10/1995 | Tisdale et al. |
| 5,480,872 | A | 1/1996 | Cope et al. |
| 5,492,938 | A | 2/1996 | Kyle et al. |
| 5,516,801 | A | 5/1996 | Horrobin et al. |
| 5,520,938 | A | 5/1996 | Brunnqueli |
| 5,603,959 | A | 2/1997 | Horrobin et al. |
| 5,604,216 | A | 2/1997 | Horrobin |
| 5,614,244 | A | 3/1997 | Heick et al. |
| 5,656,319 | A | 8/1997 | Barclay |
| 5,665,375 | A | 9/1997 | Meier et al. |
| 5,670,540 | A | 9/1997 | Horrobin et al. |
| 5,711,983 | A * | 1/1998 | Kyle et al. .................. 426/635 |
| 5,723,166 | A | 3/1998 | Theuer et al. |
| 5,753,228 | A | 5/1998 | Sterling et al. |
| 6,036,992 | A | 3/2000 | Borror et al. |
| 6,149,964 | A | 11/2000 | Theuer et al. |
| 6,432,468 | B1 | 8/2002 | Akimoto et al. |
| 6,579,551 | B1 | 6/2003 | Theuer et al. |
| 6,582,941 | B1 * | 6/2003 | Yokochi et al. ............. 435/134 |
| 6,602,902 | B2 * | 8/2003 | Shashoua et al. ............ 514/449 |
| 7,141,266 | B2 * | 11/2006 | Theuer et al. ............... 426/614 |
| 2002/0025943 | A1 * | 2/2002 | Bradley et al. ................ 514/49 |
| 2003/0207004 | A1 | 11/2003 | Theuer et al. |
| 2004/0091599 | A1 | 5/2004 | Theuer et al. |
| 2004/0106589 | A1 * | 6/2004 | Webb et al. ................. 514/182 |

FOREIGN PATENT DOCUMENTS

| | | |
|---|---|---|
| EP | 0443047 B1 | 3/1994 |
| EP | 0775449 A1 | 5/1997 |
| JP | 57-115159 | 7/1982 |
| JP | 59-39258 | 3/1984 |
| JP | 01-160989 | 6/1989 |
| JP | 62-120340 | 6/1997 |
| JP | 09285267 | 11/1997 |
| WO | WO 89/11521 | 11/1989 |
| WO | WO 96/00016 | 1/1996 |
| WO | WO 97/26804 | 7/1997 |

OTHER PUBLICATIONS

Kretchmer et al. The Role of Nutrition in the Development of Normal Cognition. Am. J. Clin. Nutr. 1996, 63:997S-1001S.*

Oski. What We Eat May Determine Who We Can Be. Nutrition. vol. 13, No. 3. 1997. pp. 220-221.*

Farquharson et al. Effect of Diet on the Fatty Acid Composition of the Major Phospholipidsof Infant Cerebral Cortex. Disease in Childhood, vol. 72. 1995. Abstract.*

Tate, "Baby Formula and Baby Food," 1994, Article HE-461.

Agostoni et al., "Neurodevelopmental Quotient of Healthy Term Infants at 4 Months and Feeding Practice: The Role of Long-Chain Polyunsaturated Fatty Acids," Pediatric Res., 1995, pp. 262-266, vol. 38.

American Academy of Pediatrics, News Release—Use of Medication for Attention Deficit Disorder Doubles, Dec. 1996, 1 page.

Anderson et al., "Breast-Feeding and Cognitive Development: A Meta-Analysis," Am. J. Clin. Nutr., 1999, pp. 525-535, vol. 70.

Auestad et al., "Visual Acuity, Erythrocyte Fatty Acid Composition, and Growth in Term Infants Fed Formulas with Long Chain Polyunsaturated Fatty Acids for One Year," 1997, pp. 1-10, vol. 41.

Biagi et al., "The Effect of Gamma-Linolenic Acid on Clinical Status, Red Cell Fatty Acid Composition and Membrane Microviscosity in Infants with Atopic Dermatitis," Drugs Exptl. Clin. Res., 1994, pp. 77-84, vol. XX.

Birch et al., "Visual Acuity and the Essentiality of Docosahexaenoic Acid and Arachidonic Acid in the Diet of Term Infants," Pediatric Res., 1998, pp. 201-209, vol. 44.

Birch et al., "Breast-Feeding and Optimal Visual Development," J. Pediatr. Ophthalmol. Strabismus., 1993, pp. 33-38, vol. 30.

Birch et al., "A Randomized Controlled Trial of Early Dietary Supply of Long-Chain Polyunsaturated Fatty Acids and Mental Development in Term Infants," Dev. Med. Child Neurol., pp. 174-181, vol. 42.

Bjerve et al., "Omega-3 Fatty Acids: Essential Fatty Acids with Important Biological Effects, and Serum Phospholipid Fatty Acids as Markers of Dietary w3-Fatty Acid Intake," Am. J. Clin. Nurt., 1993, pp. 801S-806S, vol. 57.

Bonanome et al., "n-3 Fatty Acids Do Not Enhance LDL Susceptibility to Oxidation in Hypertriacyglycerolemic Hemodialyzed Subjects," Am. J. Clin. Nutr., 1996, pp. 261-266, vol. 63.

Boschert, "Children with ADHD Often Have Sleep Disorders," Pediatric News, 1996, p. 15.

Campbell et al., "An External Formula Containing Fish Oil, Indigestible Oligosaccharides, Gum Arabic and Antioxidants Affects Plasma and Colonic Phospholipid Fatty Acid and Prostaglandin Profiles in Pigs," J. Nutr., 1997, pp. 137-145, vol. 127.

Carlson et al., "Long-Chain Fatty Acids and Early Visual and Cognitive Development of Preterm Infants," European J. Clin. Nutr., 1994, pp. S27-S30, vol. 48.

Carlson, "Arachidonic Acid Status of Human Infants: Influence of Gestational Age at Birth and Diets with Very Long Chain n-3 and n-6 Fatty Acids," J. Nutr., 1996, pp. 1092S-1098S, vol. 126.

Carlson et al., "Visual-Acuity Development in Healthy Preterm Infants: Effect of Marine-Oil Supplementation," Am. J. Clin. Nutr., 1993, pp. 35-42, vol. 58.

Carlson, "Functional Effects of Increasing Omega-3 Fatty Acid Intake," J. Pediatr., 1997, pp. 173-175, vol. 131.

Cheruku et al., "Higher Maternal Docosahexaenoic Acid (DHA) is Associated with More Mature Neonatal Sleep State Patterning," FASEB J., 2000, p. A531, vol. 14, Abstract No. 369.1.

Clandinin et al., "Optimizing the Fatty Acid Balance in Preterm Infant Formulas: Effect of 20:4(6) and 22:6(3) on the Fatty Acid Composition of Erythrocyte Membrane Phospholipids," Pediatric Research Program Issue APS-SPR, 1996, p. 306A, vol. 39, Abstract No. 1819.

Conquer et al., "Supplementation with an Algae Source of Docosahexaenoic Acid Increases (n-3) Fatty Acid Status and Alters Selected Risk Factors for Heart Disease in Vegetarian Subjects," J. Nutr., 1996, pp. 3032-3039, vol. 126.

Diamond, "Prefrontal Cortex Development and Development of Cognitive Function," International Encyclopedia of the Social & Behavorial Sciences, 2001, pp. 11976-11982.

Fernandes et al., "Role of Omega-3 Fatty Acids in Health and Disease," Nutr. Res., 1993, pp. S19-S45, vol. 13.

Forsyth et al., "Do Long-Chain Polyunsaturated Fatty Acids Innfluence Infant Cognitive Behavious?" Biochemical Society Transactions, 1998, pp. 252-257, vol. 26.

Gephart, "A Managed Care Approach to ADHD," Contemporary Pediatrics, 1997, pp. 123-139.

Hartmann et al., "Longitudinal Behavioral Measures of Visual Acuity in Full-Term Human Infants Fed Different Dietary Fatty Acids," Investigative Ophthalmology & Visual Science, 1995, vol. 36, p. S369, Abstract 3983.

Herber et al., "Metabolism and Nutrition Dietary Marine Algae Promotes Efficient Deposition of n-3 Fatty Acids for the Production of Enriched Shell Eggs," Poultry Sci., 1996, pp. 1501-1507, vol. 75.

Hoffman et al., "Effects of Supplementation with w3 Long-Chain Polyunsaturated Fatty Acids on Retinal and Cortical Development in Premature Infants," Am. J. Clin. Nutr., 1993, pp. 807S-812S, Vo. 57.

Huang et al., "Arachidonate and Docosahexaenoate Added to Infant Formula Influence Fatty Acid Composition and Subsequent Eicosanoid Production in Neonatal Pigs," 1996, pp. 2199-2208.

Hughes et al., "Fish Oil Supplementation Inhibits the Expression of Major Histocompatibility Complex Class II Molecules and Adhesion Molecules on Human Monocytes," Am. J. Clin. Nutr., 1996, pp. 267-272, vol. 63.

Iacono et al., "Effects of Polyunsaturated Fats on Blood Pressure," Annu. Rev. Nutr., 1993, pp. 243-260, vol. 13.

Innis et al., "Development of Visual Acuity in Relation to Plasma and Erythrocyte w-6 and w-3 Fatty Acids in Healthy Term Gestation Infants," Am. J. Clin. Nutr., 1994, pp. 347-352, vol. 60.

Innis et al., "Plasma and Red Blood Cell Fatty Acids of Low-Birth-Weight Infants Fed Their Mother's Expressed Breast Milk or Perterm-Infant Formula," Am. J. Clin. Nurt., 1990, pp. 994-1000, vol. 51.

Innis et al., "Prospective Evaluation of Preferential Looking Acuity in Healthy Term Infants Fed Infant Formula of Breast-Fed," The American Pediatric Society and The Society for Pediatric Research, Abstracts and Program Outline, 1995, pp. 310A, Abstract No. 1842.

Jackson et al., Weaning Foods Cannot Replace Breast Milk as Sources of Long-Chain Polyunsaturated Fatty Acids, Am. J. Clin. Nutr., 1989, pp. 980-982, vol. 50.

Jensen et al., "Effect of Dietary Linoleic/Alpha-Linolenic Acid Ratio on Growth and Visual Function of Term Infants," J. Pediatr., 1997, pp. 200-209, vol. 131.

Jumpsen et al., "Small Changes of Dietary (n-6) and (n-3)/Fatty Acid Content Ratio Alter Phosphatidylethanolamine and Phosphatidylcholine Fatty Acid Composition During Development of Neuronal and Glial Cells in Rats," J. Nutr., 1997, pp. 724-731, vol. 127.

Kelley et al., "Dietary α-Linolenic Acid and Immunocompetence in Humans," Am. J. Clin. Nutr., 1991, pp. 40-46, vol. 53.

Lagstrom et al., "Nutrient Intakes by Young Children in a Prospective Randomized Trial of a Low-Saturated Fat, Low-Cholesterol Diet," Arch Pediatr. Adolesc. Med., 1997, pp. 181-188, vol. 151.

Lucas et al., "Efficacy and Safety of Long-Chain Polyunsaturated Fatty Acid Supplementation of Infant-Formula Milk: A Randomised Trial," The Lancet, 1999, pp. 1948-1954, vol. 354.

Luukkainen et al., "Impact of Solid Food on Plasma Arachidonic and Docosahexaenoic Acid Status of Term Infants at 8 Months of Age," J. Pediatr. Gastroenter. Nutr., 1996, pp. 229-234, vol. 23.

Magnusson et al., "Mechanism of Iodide-Dependent Catalatic Activity of Thyroid Peroxidase and Lactoperoxidase," J. Biol. Chem., 1984, pp. 197-205, vol. 259.

Makrides et al., "A Critical Appraisal of the Role of Dietary Long-Chain Polyunsaturated Fatty Acids on Neural Indices of Term Infants: A Randonmized, Controlled Trial," Pediatrics, 2000, pp. 32-38, vol. 105.

Makrides et al., "Are Long-Chain Polyunsaturated Fatty Acids Essential Nutrients in Infancy?" Lancet, 1995, pp. 1463-1468, vol. 345.

Makrides et al., "Fatty Acid Composition of Brain, Retina, and Erythrocytes in Breast- and Formula-Fed Infants," Am. J. Clin. Nutr., 1994, pp. 189-194, vol. 60.

Makrides et al., "Erythrocyte Docosahexaenoic Acid Correlates with the Visual Response of Healthy, Term Infants," Pediatric Res., 1993, pp. 425-427, vol. 33.

Makrides et al., "Annotation The Effecet of Dietary Fat on the Developing Brain," J. Paediatr. Child Health, 1993, pp. 409-410, vol. 29.

Nair et al., "Prevention of Cardiac Arrhythmia by Dietary (n-3) Polyunsaturated Fatty Acids and Their Mechanism of Action," J. Nutr., 1997, pp. 383-393, vol. 127.

Neuringer, "Cerebral Cortex Docosahexaenoic Acid is Lower in Formula-Fed Than in Breast-Fed Infants," Nutrition Reviews, pp. 238-241, vol. 51.

Nettleton, "w-3 Fatty Acids: Comparison of Plant and Seafood Sources in Human Nutrition," J. Am. Diet Assoc., 1991, pp. 331-337, vol. 91.

Ono et al., "Water Activity-Adjusted Enzymatic Partial Hydrolysis of Phospholipids to Concentrate Polyunsaturated Fatty Acids," JAOCS, 1997, pp. 1415-1417, vol. 74.

Palombo et al., "Rapid Modulation of Lung and Liver Macrophage Phospholipid Fatty Acids in Endotoxemic Rats by Continuous Enteral Feeding with n-3 and y-Linolenic Fatty Acids," Am. J. Clin. Nutr., 1996, pp. 208-219, vol. 63.

Sanders, "Marine Oils: Metabolic Effects and Role in Human Nutrition," Proceedings of the Nutrition Society, 1993, pp. 457-472, Vo. 52.

Scheideler et al., International Conference on the Return of w-3 Fatty Acids Into the Food Supply: I. Land-Based Animal Food Products and Their Health Effects, 1997.

Salem et al., Are w3 Fatty Acids Essential Nutrients for Mammals? World Review of Nutrition and Dietetics, 1993, pp. 128-147, vol. 72.

Scott et al., "Formula Supplementation with Long-Chain Polyunsaturated Fatty Acids: Are There Developmental Benefits?," Pediatrics, 1998, 3 pages, vol. 102.

Simopoulos et al., "Egg Yolk as a Source of Long-Chain Polyunsaturated Fatty Acids in Infant Feeding," Am. J. Clin. Nutr., 1992, pp. 411-414, vol. 55.

Simopoulos, "Summary of the NATO Advanced Research Workshop on Dietary w3 and w6 Fatty Acids: Biological Effects and Nutritional Essentiality," J. Nutr., 1989, pp. 521-528, vol. 119.

Slater, "Individual Differences in Infancy and Later IQ," J. Child. Psychol. Psychiat., 1995, pp. 69-112, vol. 36.

Spock, "Baby and Child Care," 1957, pp. 132-133.

Stevens et al., "Essential Fatty Acid Metabolism in Boys with Attention-Deficit Hyperactivity Disorder," Am. J. Clin. Nutr., 1995, pp. 761-768, vol. 62.

Stevens et al., "Omega-3 Fatty Acids in Boys with Behavior Learning, and Health Problems," Physiol. Behav., 1996, pp. 915-920, vol. 59.

Uauy, "Are w-3 Fatty Acids Required for Normal Eye and Brain Development in the Human?" J. Pediatr. Gastroenterol. Nutr., 1990, pp. 296-301, vol. 11.

Uauy et al., "Safety and Efficacy of Omega-3 Fatty Acids in the Nutrition of Very Low Birth Weight Infants: Soy Oil and Marine Oil Supplementation of Formula," J. Pediatr., 1994, pp. 612-620, vol. 134.

Uauy et al., "Role of Essential Fatty Acids in the Function of the Developing Nervous System," Lipids, 1996, pp. S-167-S-176, vol. 31.

Uauy-Dagach et al., "Nutritional Role of Omega-3 Fatty Acids During the Perinatal Period," Clinics in Perinatology, 1995, pp. 157-175, vol. 22.

Werkman et al., "A Randomized Trial of Visual Attention of Preterm Infants Fed Docosahexaenoic Acid Until None Months," Lipids, 1996, pp. 91-97, vol. 31.

Willats et al., "The Role of Long-Chain Polyunsaturated Fatty Acids in Infant Cognitive Development," Prostaglandins, Leukotrienes and Essential Fatty Acids, 2000, pp. 95-100, vol. 63.

Willats, "Development to Means-End Behavior in Young Infants: Pulling a Support to Retrieve a Distant Object," Dev. Psych., 1999, pp. 651-667, vol. 35.

Willats et al., "Influence of Long-Chain Polyunsaturated Fatty Acids on Infant Cognitive Function," Lipids, 1998, pp. 973-980, vol. 33.

Willats et al., "Effect of Long-Chain Polyunsaturated Fatty Acids in Infant Formula on Problem Solving at 10 Months of Age," Lancet, 1998, pp. 688-691, vol. 352.

Willats, "Beyond the "Couch Potato" Infant: How Infants Use Their Knowledge to Regulate Action, Solve Problems, and Achieve Goals," Infant Development: Recent Advances, 1997, pp. 109-135.

Willats, "The Stage-IV Infant's Solution of Problems Requiring the Use of Supports," Infant Behav. Dev., 1984, pp. 125-134, vol. 7.

Willats, "Stages in the Development of Intentional Search by Young Infants," Dev. Psych., 1984, pp. 389-396, vol. 20.

Willats, "Adjustment of Reaching to Change in Object Position by Young Infants," Child Development, 1979, pp. 911-913, vol. 50.

Wu et al., "Immunologic Effects of Marine- and Plant-Derived n-3 Polyunsaturated Fatty Acids in Nonhuman Primates," Am. J. Clin. Nutr., 1996, pp. 273-280, vol. 63.

Rome, FAO/WHO Expert Consultation on Fats and Oils in Human Nutrition, FAO 1994, Rome, pp. 52-55.

Birch et al., "A Randomized Controlled Trial of Long-Chain Polyunsaturated Fatty Acid Supplementation of Formula in Term Infants After Weaning at 6 Weeks of Age," Am. J. Clin. Nutr., 2002, pp. 570-580, vol. 75.

Gibson et al., "Eggs as a Source of Essential Docosahexaenoic Acid (DHA) in the Diets of Weaning Infants," Rural Industries Research & Development Corporation, 1998.

Neuringer, "Infant Vision and Retinal Function in Studies of Dietary Long-Chain Polyunsaturated Fatty Acids: Methods, Results, and Implications," Am. J. Clin. Nutr., 2000, pp. 256S-276S, vol. 71.

Neuringer et al., "Biochemical and Functional Effects in Prenatal and Postnatal w3 Fatty Acid Deficiency on Retina and Brain in Rhesus Monkeys," Proc. Natl. Acad. Sci. USA, 1986, pp. 4021-4025, vol. 83.

Rogers, "Feeding in Infancy and Later Ability and Attainment: A Longitudinal Study," Dev. Med. Child. Neurol., 1978, pp. 421-426, vol. 20.

Colombo et al., "Maternal DHA and the development of attention in infancy and toddlerhood", Child Dev., Jul.-Aug. 2004, 75(4), pp. 1254-1267 (abstract).

Gil et al., "Role of long-chain polyunsaturated fatty acids in infant nutrition", Eur J. Clin Nutr., Sep. 2003, 57 Suppl 1:S31-4 (abstract).

Heiland et al., "Maternal supplementation with very-long-chain n-3 fatty acids during preg. and lactation augments children's IQ at 4 yrs of age", Ped., Jan. 03, 111(1)e39-44.

Willatts<"Long chain polyunsaturated fatty acids improve cognitive development", J Fam Health Care, 2002; 12(6 Suppl):5 (abstract).

* cited by examiner

METHOD OF ENHANCING COGNITIVE ABILITY IN INFANT FED DHA CONTAINING BABY-FOOD COMPOSITIONS

CROSS REFERENCE TO RELATED APPLICATIONS

This application is a continuation-in-part of U.S. patent application Ser. No. 10/702,760 filed Nov. 6, 2003 now U.S. Pat. No. 7,141,266, which is a continuation-in-part of U.S. patent application Ser. No. 10/460,687 filed Jun. 12, 2003 now abandoned, which is a continuation of U.S. patent application Ser. No. 09/716,518 filed Nov. 20, 2000, now U.S. Pat. No. 6,579,551, which is a continuation-in-part of U.S. patent application Ser. No. 09/082,634 filed May 21, 1998, now U.S. Pat. No. 6,149,964. All of the aforementioned applications and patents are incorporated herein in their entireties by reference.

GOVERNMENT CONTRACT

The development of this invention was supported in part by grant number HD22380 awarded by the National Institutes of Health. The U.S. Government may, therefore, have certain rights in this invention.

FIELD

This invention relates generally to food compositions and, more particularly, to baby-food compositions comprising docosahexaenoic acid (DHA) and to methods of using the compositions to improve the health and development of an infant including enhancing cognitive ability.

INTRODUCTION

Long-chain polyunsaturated fatty acids (LCPUFA) such as the ω-3 fatty acid, docosahexaenoic acid (DHA), have been shown to be required nutrients for optimal maturation of visual and cortical function in human infants (See, for example, Hoffman et al., *Am. J. Clin. Nutr.* 57(suppl.):807S-12S, 1993; Makrides et al., *Lancet* 345:1463-1468, 1995). Evidence indicates that breast-fed infants have a long-term advantage in cognitive development over formula-fed infants (Rogers, Dev. Med. Child Neurol. 20: 421-426, 1978). Several studies suggest that deficiency in formula of LCPUFA such as DHA can be an important factor correlating with these observations (Makrides et al., Pediatr. Res. 33: 425-427, 1993; Neuringer et al., Proc. Nat'l. Acad. Sci. USA 83: 4021-4025, 1986). Although the minimum dietary amount of DHA required by infants has not been unequivocally established, the Food and Agriculture Organization and World Health Organization recommend 40 mg/kg body weight for preterm infants and 20 mg/kg for term infants (*FAO/WHO Expert Consultation on Fats and Oils in Human Nutrition*, FAO 1994, Rome, pp. 52-55). For term infants this is about 70 mg at birth in about 420 calories and 140 mg at 6 months of age in about 700 calories.

LCPUFA such as DHA can be provided to breast-fed infants through their mother's milk, which contains a full-complement of both ω-6 and ω-3 polyunsaturated fatty acids (Hoffman et al, 1993, supra; Makrides et al., 1995, supra; Innis et al, *Am. J. Clin. Nutr* 60:347-352, 1994). The concentration of DHA in breast milk can, however, vary depending upon the mother's diet and in addition, many infants are not breast-fed or are breast-fed only for a few weeks and subsequently must rely on infant formula and solid baby food for their nutritional requirements.

In the past, infant formulas sold in the United States have not contained DHA (Jensen et al., *J. Pediatr.* 131:200-209, 1997). However, term infants fed formula supplemented with LCPUFA up to 4-months of age showed improved cognitive development at 10 months of age (Willats et al., *Lancet* 352: 688-691, 1998) and eighteen months of age (Birch et al., *Dev. Med. Child Neurol.* 42:174-181).

Semi-solid foods fed to babies contain DHA in less than a substantial amount. The amount of DHA in semi-solid foods is less than 5 mg DHA/100 grams of composition. Intake of fat from such semi-solid foods does not increase plasma DHA levels, in contrast to breast feeding (Luukkainen et al., *J. Pediatr. Gastroenterol. Nutr.* 23: 229-234, 1996).

Sources of DHA that have been added to infant formula to increase the content of DHA include marine oil, extracted egg-yolk lipids and lipids derived from animal tissue phospholipids (U.S. Pat. No. 4,670,285 to Clandinin; Uauy, et al., *J. Pediatr.* 134:612-620, 1994; Makrides, et al., 1995, supra; Carlson, *J. Nutr.* 126:10925-10985, 1996). However, marine oil tends to have a strong fishy taste and odor and thus can be poorly suited for a solid baby food. In addition, lipids extracted from egg yolk and animal tissue are susceptible to oxidative deterioration. Also, with respect to semi-solid baby-food preparations, production of fish and/or animal oils requires extensive processing, so that the use of such processed oils in a baby-food composition would diverge from the "whole food" and "natural food" concepts of baby food which is popular among caregivers.

One dietary source of DHA in adult foods is whole egg yolk or egg yolk solids. Semi-solid baby-food compositions currently or previously sold commercially in the United States have contained either a small amount of egg-yolk solids, i.e. less than 5%, or a large amount of egg-yolk solids, i.e. about 29% to 30% or more, neither of which is entirely satisfactory as a food source. Baby-food compositions containing less than 5% egg-yolk solids do not provide the amount of nutritional components available in the compositions having higher percentages of egg yolk, whereas baby-food compositions with the higher percentages of egg yolk have not been organoleptically acceptable, i.e., have been extremely poor in taste and, as a result, are no longer commercially available. Indeed, it is well known that infants typically reject cooked egg yolk, apparently because of its strong taste and gritty, mealy texture.

Although hens' eggs ordinarily contain only very low amounts of DHA, hens fed a diet enriched with DHA or DHA precursor can contain about 89-112 mg DHA per egg yolk or about 10 mg DHA per gram of egg-yolk solids. See Table 1, infra. Such DHA-enriched eggs have been developed as sources of DHA for human consumption (Herber et al., *Poultry Sci* 75:1501-1507, 1996; Oh, U.S. Pat. No. 5,415,879, 1995). Furthermore, infant diets containing DHA-enriched egg yolks increased the amount of DHA in the blood of formula fed infants up to levels similar to those of breast fed infants (Gibson et al., *Eggs as a Source of Essential Docosahexaenoic Acid (DHA) in the Diets of Weaning Infants*, Rural Industries Research & Development Corporation, 1998). Nevertheless, these investigations provided no suggestion as to how such DHA-enriched eggs might be incorporated into an organoleptically acceptable semi-solid baby-food preparation or one that is shelf-stable and commercially viable.

Thus, there remains a continuing need for a semi-solid, shelf-stable, baby-food composition that can be used to improve cognitive ability in an infant.

SUMMARY

Accordingly, the inventors herein have succeeded in discovering that dietary DHA can be supplemented in breast-fed infants by feeding the infants semi-solid baby foods containing DHA, and that infants breast-fed for an average of 9 months and who receive semi-solid baby foods containing DHA have improved cognitive ability compared to similar infants who receive semi-solid baby foods that contain less than 5 mg DHA/100 grams of composition. The amount of DHA comprised by a composition of the present teachings can be at least sufficient to provide at least 45 milligrams of DHA in a day to an infant. In various configurations, the baby-food composition can be a shelf-stable semi-solid baby-food composition comprising DHA in an amount of at least about 50 mg DHA/100 grams of composition in an acceptable baby-food preparation. Accordingly, in various embodiments, the present teachings disclose methods for improving cognitive ability in an infant. A method of these embodiments can comprise feeding the infant a semi-solid baby-food composition comprising at least about 50 mg DHA/100 grams of composition in an acceptable baby-food preparation. The improved cognitive function following administration of a DHA-containing semi-solid baby food described herein has not heretofore, been known or suggested to occur. The cognitive ability improvement is an improvement compared to cognitive ability in control infants that receive semi-solid baby foods that contain less than about 5 mg DHA100 grams composition in a day. The improvement in cognitive function can be shown upon measuring cognitive ability during the period of feeding the infant the compositions of the present invention, and beyond. Cognitive ability can be measured by any of a number of methods known in the art. One such well known method of assessing cognitive development in an infant is the measuring of means-ends problem solving ability (Willatts et al., *Lancet* 352: 688-691, 1998). In various embodiments, means-ends problem-solving ability can be tested at an age of at least about 8 months to age of about one year. In some configurations, means-ends problem-solving ability can be tested at an age of about 9 months. The compositions and methods of the present invention improve problem-solving ability in infants. Another well known method of assessing cognitive development in an infant is an assessment of the infant's mental development index (MDI) in accordance with the Bayley neurodevelopmental scales (Bayley, N. *The Bayley Scales of Infant Development II*. New York: New York Psychological Corp., 1993). In various embodiments, MDI can be assessed at an age of at least about one year to an age of about 36 months. In some configurations, MDI can be assessed at an age of about 18 months. In various embodiments, cognitive ability of infants of ages of about 3 years to about 7 years, 3 months can be assessed through administration of an IQ test such as the Wechsler Preschool and Primary Scale of Intelligence (WPPSI) test (Wechsler, J. Wechsler Preschool and Primary Scale of Intelligence. San Antonio: The Psychological Corp., 1989). In some configurations, cognitive ability can be assessed using the WPPSI test at an age of about 4 years. The compositions and methods of the present invention improve mental development index in infants.

In various configurations, methods of the present teachings can comprise feeding an infant at least about 50 grams of a DHA-comprising semi-solid baby-food composition described herein in a day. Furthermore, in various configurations, a semi-solid baby-food composition of the present teachings can comprise at least about 50 mg DHA/100 grams, at least about 100 mg DHA/100 grams, or at least about 115 mg DHA/100 grams of composition. Hence, in various configurations, a baby-food jar comprising 113 grams of baby-food can comprise at least about 56 milligrams, at least about 113 milligrams, or at least about 130 milligrams of DHA, and methods of the present teachings can comprise feeding an infant at least about 50 grams of composition of the present teachings in a day, at least about 100 grams of composition in a day, about 113 grams of baby-food composition (i.e., the amount of composition comprised by standard baby-food jar) in a day, or more.

In various embodiments, feeding an infant a composition of the present teachings can commence as early as an infant will ingest semi-solid food, which can be, in non-limiting example, as early as about 4 months of age, about 5 months of age, or about 6 months of age. Feeding the infant a composition can continue until the age of about 9 months, the age of about one year, or older. In various aspects, a composition can be fed to an infant as a supplement to breast feeding or as a substitute for breast feeding.

In various embodiments, cognitive ability can be improved in infants as evidenced by test scores in means-ends problem solving tests. In these configurations, average test scores can increase by at least about 10%, at least about 20%, at least about 30%, at least about 40%, or at least about 50%, in infants fed a DHA-enriched composition described herein from an age of about 6 months, in comparison to infants fed a semi-solid baby food composition that contains less than about 5 milligrams DHA/100 grams composition. In these configurations, problem-solving tests can be administered at the age of about 9 months or older, such as an age of about one year.

In various embodiments, an improvement in cognitive ability in infants fed a DHA-containing semi-solid baby food described herein compared to control infants can be evidenced by an increase in average MDI scores of at least about 1%, at least about 2%, at least about 3% or at least about 4% in infants fed a DHA-enriched composition described herein from an age of about 6 months, in comparison to infants fed a semi-solid baby food composition that contains less than about 5 mg DHA/100 grams of composition. In certain configurations, infants fed a DHA-enriched composition described herein during the ages of about 6 months to about 9 months or older, such as one year, can show an increase in MDI score when assessed at an age between about 16 months and about 20 months, or older. In certain configurations, an assessment of MDI can be conducted at the age of about 18 months. Accordingly, infants fed a formulation of the present teachings from an age of about 6 months to an age of about one year can exhibit increased cognitive ability, as compared to control infants fed a semi-solid baby food composition that contains less than about 5 mg DHA/100 gram composition, over the same developmental time period, when tested at an age suitable for an assessment of MDI, which can be, in various configurations, at least about one year, at least about 18 months, or at least about 4 years.

In various embodiments of the present teachings, infants or children of 2 years of age, 3 years of age, 4 years of age, or older, who as infants between about 6 months and 9 months of age, or between about 6 months and one year of age, are fed a DHA-containing semi-solid baby food described herein, exhibit improved cognitive ability, in comparison to control infants and children, who, as infants, are fed a semi-solid baby food composition that contains less than about 5 mg DHA/100 grams of composition over the same developmental time periods. Enhanced cognitive function in children fed a DHA-enriched diet of the present teachings as infants can be evidenced by increased average scores on IQ tests. An increase in average IQ test score can be expected to be at least about 2 points as measured using the WPPSI test.

The amount of DHA which produces the enhancement can be about 50 mg DHA or greater per 100 grams of the composition.

Accordingly, in various embodiments, the present teachings are directed to a semi-solid baby-food composition. The composition comprises DHA in an amount of at least about 50 mg DHA/100 grams of the composition. The composition is in an acceptable, shelf-stable baby-food preparation.

In various embodiments, the present teachings are also directed to methods for improving cognitive ability in an infant. The methods comprise feeding to the infant, a shelf-stable semi-solid baby-food composition containing DHA in an amount of at least about 50 mg DHA/100 grams of composition. The composition can be in an acceptable baby-food preparation.

In one aspect these methods can comprise providing a semi-solid baby-food composition having a formula selected on the basis of its containing DHA in an amount of at least about 50 mg DHA/100 grams of composition in an acceptable, shelf-stable baby-food preparation. The baby-food composition can be fed to the infant to produce the improvement in cognitive ability.

In various embodiments, the present teachings are also directed to a method for a providing to a consumer, a baby-food composition that improves cognitive ability in an infant. The method can comprise providing a shelf-stable semi-solid baby-food composition having a formula selected on the basis of its containing DHA in an amount of at least about 50 mg DHA/100 grams of composition in an acceptable, shelf-stable baby-food preparation. The baby-food composition can then be sold to the consumer. In various embodiments, the DHA can be in an amount of at least about 100 mg per 100 grams of composition. In certain aspects, the baby-food composition can comprise about 113 grams (about 4 ounces) of composition, and can be comprised by a container such as a standard baby-food jar.

The acceptability of the baby-food compositions in various embodiments includes the organoleptic acceptability, which can be measured, for example by determining the value on a nine-point hedonic scale. A composition is considered, herein, to be organoleptically acceptable if the Appearance/Color, Flavor, and Mouthfeel/Texture of the composition each score at least about five or greater on a nine-point hedonic scale.

In various embodiments of the present invention, the baby-food composition can comprise coagulated egg yolk solids in an amount of from about 5% to about 25% (grams/100 grams) of the composition, i.e. from about 5 grams egg yolk solids per 100 grams composition to about 25 grams egg yolk solids per 100 grams composition. The coagulated egg yolk solids that are incorporated into the composition can contain DHA in an amount of at least about 9 mg DHA/gram of egg yolk solids, thereby substantially providing the DHA present in the composition.

The organoleptic acceptability in terms of Mouthfeel/Texture can be achieved by adding an acidulant or by processing the baby-food composition with a microcutter. Either approach can produce a smooth Mouthfeel/Texture scoring at least 5 on a nine-point hedonic scale. The acidulant when present, can be an acid, a cultured food substance containing lactic acid, or a fruit or vegetable component which contributes acidity to the composition. Incorporated acids can include citric acid, phosphoric acid, acetic acid or vinegar and combinations thereof. Suitable fruits or vegetables include juices or purees of apple, apricot, banana, beets, blueberry, carrots, celery, cherry, clementine, cress, elderberry, grape, grapefruit, lemon, mango, orange, papaya, peach, pear, pineapple, plum, raspberry, rhubarb, sorrel, strawberry, sweet potato, tomato, and combinations thereof.

In various embodiments, the present invention is also directed to a baby-food composition comprising from about 5% to about 25% coagulated egg-yolk solids (grams/100 grams) in absence of added acidulant. The composition is in an acceptable, shelf-stable baby-food preparation for which Appearance/Color, Flavor, and Mouthfeel/Texture scores on a nine-point hedonic scale are each at least about five. In various aspects of this embodiment, the use of a microcutter achieves a smooth Mouthfeel/Texture scoring five or greater on a nine-point hedonic scale.

DETAILED DESCRIPTION

The present teachings are based upon the discovery that a semi-solid baby food containing DHA in an amount of at least about 50 mg DHA per 100 grams composition (0.05% w/w), can improve the cognitive ability of breast-fed infants receiving the composition. The cognitive ability improvement is an improvement compared to cognitive ability in infants that receive semi-solid baby foods containing less than about 5 mg DHA per 100 grams of composition. In some embodiments, an improvement in cognitive ability can result from feeding an infant a semi-solid baby food of the present teachings commencing from the time an infant can consume semi-solid food, such as, in non-limiting example, during the ages of about 4 months to about 9 months, about 5 months to about 9 months, or about 6 months to about 9 months. The improvement can be detected by testing, for example as early as about 9 months of age, at about one year of age, at about 18 months of age, or at about four years of age.

Semi-solid compositions of the present teachings can be distinguished from liquid compositions such as infant formula or juices and can be characterized in that they have a high viscosity and possess qualities of both a liquid and a solid. Vegetable and fruit purees are typical examples of semi-solid compositions. In various configurations of the present invention, a composition can be in dried form which can be reconstituted to produce a semi-solid baby-food. Such dried and reconstituted products are intended to be included within the meaning of the term semi-solid baby-food composition.

The term baby or infant as used herein is intended to mean a child in the first period of life generally considered to be in the age range of from birth to about four years. As used herein, the terms cognitive ability and cognitive function are synonymous, and refer to cognitive function that can be measured using one or more different tests that are well known to persons of skill in the art, such as child psychologists and educators. As used herein, the phrase "in a day" is intended to mean within or over the course of a twenty-four hour period.

An acceptable baby-food composition or an acceptable baby-food preparation is intended to encompass semi-solid food preparations which can be fed to a baby or an infant and meeting all of the regulatory and organoleptic requirements for such compositions.

In various embodiments, the compositions of the present invention can be shelf stable. By shelf stable with respect to a baby-food composition, it is meant that the composition can be stored un-refrigerated on the shelf for a period of time and remain suitable for consumption. Shelf-stable foods can be processed and packaged in a manner such that microorganisms are inhibited from growing in the product at non-refrigerated temperatures of storage over 40° F. (4° C.) for extended periods.

Although the compositions of the present teachings are referenced herein as baby-food compositions, the compositions can, of course, be consumed by other population groups such as, for example, individuals who are sick or those who have special nutritional requirements, such as, for example, geriatric individuals.

In various embodiments, egg yolks can serve as the source of DHA in the baby-food compositions of the present invention. The baby-food compositions can comprise coagulated egg yolk solids in amounts of from about 5% to about 25%, from about 6% or about 7% to about 20%, from about 10% to about 15%, or from about 12% to about 13% of the composition.

The term "about" is intended to include small variances, for example 0.5 percentage points above and below a given value. Thus, in various embodiments, a value referenced, for example, as 15% can mean 14.5% to 15.5%.

The term egg-yolk solids is intended to mean the solids present in natural egg yolk or in dried egg-yolk products such as those commonly used as ingredients in the food industry. The egg-yolk solids can be in the yolk of a whole hen's egg as separated from the shell or in an egg yolk separated from the whole hen's egg or in a purified form in which some or all of the water has been removed from the egg yolk. The amount of solids in egg yolk from hens' eggs and dried egg-yolk products, can be determined using known methods, and are typically about 46% and about 96%, respectively.

As noted above, certain baby-food compositions containing egg yolk are currently commercially available while other baby-food compositions containing egg yolk were available in the past but are no longer available. However, none of these compositions are believed to have contained from about 5% to about 25% egg-yolk solids (see Example 1 below).

In certain embodiments, the egg-yolk solids contain high levels of DHA as a result of being produced from eggs laid by hens fed a diet enriched with DHA or DHA precursors such as one containing DHA from marine algae, fish oil or other source of DHA or alpha-linolenic acid from flaxseed or canola or soybean. (See, for example, Herber et al., 1996, supra; Oh, 1995, supra; Abril et al., *International Conference on The Return of ω-3 Fatty Acids Into the Food Supply: I. Land-Based Animal Food Products and Their Health Effects*, Sep. 18-19, 1997; Scheideler et al., *International Conference on The Return of ω-3 Fatty Acids Into the Food Supply: I. Land-Based Animal Food Products and Their Health Effects*, Sep. 18-19, 1997). Such DHA-enriched eggs are commercially available and their yolk solids can typically contain from about 9 to about 19 mg DHA per gram. The amount of DHA in egg-yolk solids can be measured using methods known in the art (see Example 2 below). In various embodiments, the amount of coagulated egg yolk solids in the baby-food composition can be from about 5% to about 25%. A composition containing 5% egg yolk solids which, in turn, contain about 9 mg to about 19 mg DHA per gram would contain about 0.45 mg to about 0.95 mg DHA per gram composition. Thus, the DHA containing eggs can be used to produce a baby-food composition having a minimum of about 0.5 mg to about 1 mg DHA per gram composition.

In various embodiments, the source of DHA-enriched egg yolk and/or the amount of DHA-enriched egg-yolk solids can be selected such that the baby-food composition comprises sufficient DHA to provide the minimum daily recommended amount of about 20 mg/kg/day or about 70 mg for the newborn and about 140 mg for the 6 month infant in one or two servings. For example, a typical jar of commercial baby food for six month infants contains four ounces or 113 grams of baby-food composition. DHA can, thus, be present in an amount of 70 mg/113 grams (0.6 mg/gm) or 140 mg/113 grams (1.2 mg/gm). For convenience, the composition can also be prepared to contain 150 mg DHA per 100 g of baby food, which would amount to 165 mg DHA per jar. This amount of DHA can be provided by DHA-enriched egg yolks containing 12 mg of DHA per gram egg-yolk solids and the composition would thus contain 14 grams egg-yolk solids per jar or about 12.5% (gm/100 gm) egg-yolk solids.

Feeding DHA-containing baby-food compositions of the present invention to an infant from the age of about six months up to the age of about one year can improve the cognitive ability of the infant, in comparison to an infant fed a composition which comprises less than about 5 milligrams DHA per 100 grams composition during the same ages. An improvement in cognitive ability in an infant or child fed a DHA-enriched baby-food composition of the present teachings can be detected in comparative tests of cognitive ability during infancy, for example at about 9 months of age, at about 12 months of age, or at about 18 months of age, or during childhood, for example at an age of about four years, or older.

Feeding DHA-containing baby-food compositions of the present invention to an infant can be on a daily basis or on an intermittent basis such as, for example, for two or three days per week. Feeding can also occur for a portion of the period of from about six months to about one year, for example, from about six months to about 9 months. Moreover, feeding an infant semi-solid food can begin earlier than 6 months, for example at 4 or 5 months or even less, depending upon the baby's development.

The improvement in cognitive ability can be shown upon measuring cognitive ability over the period of feeding the infant the compositions of the present invention, and after further development. Cognitive ability can be measured by any of a number of methods known in the art. One such well known method of assessing cognitive development in an infant is the measuring of means-ends problem solving ability (Willatts et al., *Lancet* 352: 688-691, 1998). These tests measure an infant's ability to recall the location of a hidden toy, and plan and execute a sequence of actions to retrieve it. First an adult places a toy upon a first cloth and moves both back away from an infant. The infant is required to pull the cloth, and then grasp the toy. Next the adult puts the toy close to the child and places a second cloth over the toy. The infant is required to remove the cloth and grasp the toy. If the infant fails to perform these pre-test tasks, the trial is terminated. For the scored test, the adult places the toy on the first cloth, covers the toy with the second cloth, and then moves everything back away from the infant. It is up to the infant to reach out and grab the first cloth, pull it together with the toy and second cloth towards himself or herself, lift the second cloth, and grasp the toy. The infant is given three such scored trials. Each trial can be scored on a scale from −1 to 12 based upon the infant's ability to focus and complete the task. In various configurations, average means-ends problem solving test scores for 9 month old infants fed a DHA-enriched composition of the present teachings from an age of about 6 months to an age of about 9 months, can be at least about 10%, at least about 20%, at least about 30%, at least about 40%, or at least about 50% greater than average means-ends problem solving test scores for control 9 month old infants fed a semi-solid baby food composition that contains less than about 5 mg DHA/100 grams of composition, from an age of about 6 months to an age of about 9 months.

Another well known method of assessing cognitive development in an infant is an assessment of the infant's mental development index (MDI) in accordance with the Bayley neurodevelopmental scales (Bayley, N. *The Bayley Scales of*

*Infant Development II*. New York: New York Psychological Corp., 1993). For children ages of about 3 years to about 7 years, 3 months, general intellectual function can be assessed using an IQ test procedure such as the Wechsler Preschool and Primary Scale of Intelligence (WPPSI) test (Wechsler, J. Wechsler Preschool and Primary Scale of Intelligence. San Antonio: The Psychological Corp., 1989).

The egg yolk containing compositions of the present invention can be in acceptable baby-food formulations. The terms acceptable baby-food formulation are used interchangeably herein with the terms acceptable baby-food composition and acceptable baby-food preparation. An acceptable baby-food formulation is one suitable for feeding to a baby and included within the meaning of the terms acceptable baby-food formulation is any regulatory agency requirements for foods intended for consumption by infants. For example, lactic acid and malic acid have been reviewed by the Food and Drug Administration and determined not to be generally recognized as safe for use in baby foods for infants in the first year of life. (See 21 C.F.R. §184.1061, §184.1069). Thus, these acids would not be incorporated into an acceptable baby-food formulation. On the other hand, the use of citric acid and phosphoric acid have been determined to be generally recognized as safe (see 21 C.F.R. §184.1033, §182.1073). Therefore, these acids can be incorporated into an acceptable baby-food formulation.

In addition, an acceptable baby-food formulation can be one whose overall combination of organoleptic characteristics, i.e., taste, mouthfeel or texture, odor and color or appearance, is sufficiently satisfactory that the infant will consume the formulation and the caregiver will serve the formulation to the infant. For example, infants are known to display an aversion to bitter tastes at a very early age and to strong flavors such as can be present in some vegetables (Trahms, in *Nutrition in Infancy and Childhood*, Pipes and Trahms, Eds, Mosby, St. Louis, 1993, pp. 181-194; Kajiura et al, *Developmental Psychobiol* 25:375-386; Rosenstein et al., *Child Develop* 59:1555-1568, 1988; Lowenberg, in *Nutrition in Infancy and Childhood*, Pipes and Trahms, Eds, Mosby, St. Louis, 1993, pp. 165-180; Brooks, *The Wall St J*, Dec. 4, 1996 pp A1, A6; Lawless, *J. Am. Diet. Assoc.* 85:577-585, 1985; Ashbrook et al, *J Nutrition Ed* 17:5, 6, 46, 1985; Beal *Pediatrics* 20:448-456, 1957). Therefore, an acceptable formulation of a baby-food composition can be a formulation that is organoleptically acceptable to an infant. For example, the formulation can be a baby-food composition that does not have a strong bitter taste or a strong flavor such as can be present in some vegetable preparations.

An acceptable baby-food formulation can also have a texture that can be acceptable to the baby. For example, foods that are too dry or gritty are usually unacceptable to infants. In general, acceptable baby-food formulations will be smooth in texture. In addition, younger infants typically prefer food that is soft and homogenous. However, a nonhomogenous texture may be desired by an older infant. Because of such preferences, baby foods are typically produced in different forms, depending on the age of the intended consumer. For example, BEECH-NUT Stage 1 products are intended to be consumed by babies from about three months of age. BEECH-NUT Stage 2 products, which are strained and Will pass through a 0.050" orifice, are intended to be consumed by infants from about six months of age. Accordingly, infants of at least about eight months of age, at least about nine months of age, or older are the intended consumers of BEECH-NUT Stage 3 Junior products, which have chunky components that pass through a ⅜ inch screen.

In some embodiments, a texture acceptable to an infant can be achieved using the whole food concept by mixing whole food preparations. The whole food concept involves minimal transformation of food components during preparation, and can include, for example cleaning, peeling and comminuting the food, as distinguished from more extensive processing such as, for example, drying or milling into a flour.

In various embodiments, the color and appearance of the formulation can be such that the infant or the adult caregiver will not reject the formulation. Acceptable colors tend to be light rather than dark. In some configurations, acceptable color can be achieved using the whole food concept. In these configurations, one or more food components can be added which confer a color to the overall mixture. In certain configurations, the appearance of a formulation can also be smooth and homogenous.

In addition, a composition of various embodiments of the present teachings is not expected to produce adverse side effects such as acid indigestion, diarrhea, allergic responses or the like.

In various embodiments, testing of a baby-food composition for organoleptic acceptability can be readily performed by the skilled artisan using routine methods such as those described in the Example below. For example, since the adult perception of bitter tastes closely follows that in the infant (Lawless, 1985, supra) and since food preferences or aversions of the adult caring for the infant are known to influence which foods are offered to the infant (Trahms, in *Nutrition in Infancy and Childhood*, Pipes and Trahms, Eds, Mosby, St. Louis, 1993, pp. 181-194; Brooks, 1985, supra), it is possible to conduct acceptability testing in adults. Standard testing procedures for sensory evaluation are known in the art including, in particular, a 9-point hedonic scale as described in Example 9 below (see Stone and Sidel in *Sensory Evaluation Practices*, Academic Press, Orlando, 1985, pp 58-86, 227-252). Sensory characteristics that can be tested include appearance and color, flavor, and mouthfeel and texture. Compositions scoring above neutral on a 9-point hedonic scale, i.e. 5.0 or greater, for at least one, at least two, or all sensory characteristics of Appearance/Color, Flavor and Mouthfeel/Texture are considered to be acceptable with respect to those attributes.

In various embodiments, testing for organoleptic acceptability in infants can be conducted, for example, after obtaining informed consent from parents in a double-blind, randomized controlled study. In non-limiting example, infants of ages from about 4 months to about one year can be fed a series of baby-food compositions prepared containing, for example, 15% egg-yolk solids, or a reference baby-food preparation known to be accepted by the infants such as, for example, BEECH-NUT and GERBER vanilla custard pudding products or GERBER cherry vanilla pudding product. The adult feeding the infant can then record acceptability and tolerance including amount offered, amount consumed and amount refused by the babies. Rating of acceptability can be performed by methodology known in the art (for example, Stone and Sidel, 1985, supra). The results can be analyzed, and compositions showing acceptance comparable to or greater than that of the reference baby food can be considered organoleptically suitable for use as an infant food.

In various configurations, the baby-food compositions of the present teachings can also contain an aqueous liquid. The aqueous liquid can be added in an amount that confers a smooth texture on the composition as a whole. Non-limiting examples of aqueous liquids include water, fruit juices such as apple juice, grape juice, orange juice, and combinations thereof, and vegetable juices such as carrot juice, beet juice, celery juice, tomato juice, and combinations thereof. In certain aspects, fruit juices and some vegetable juices can also be a source of sugars for the composition.

In various embodiments, the present invention can have an acceptable Mouthfeel/Texture. An acceptable Mouthfeel/Texture can be achieved in various embodiments by addition of an acidulant or by processing the composition with a microcutter to produce a composition with a smooth Mouthfeel/Texture. In the various embodiments containing an acidulant produces a smooth Mouthfeel/Texture. Furthermore, the addition of acidulant to achieve a pH of 4.6 or less permits the sterilization of the composition at a temperature of 212° F. rather than at 250° F. temperature required for compositions having a higher pH. This lower retorting temperature not only can simplify the manufacturing procedure, it can also improve the color of the processed baby-food composition and reduce any heat-induced breakdown of its nutrients compared to retorting at 250° F. temperature required for compositions having a higher pH. The acidulant thus can be present in an amount sufficient to produce a post-processing pH of 4.6 or less, such as a post-processing pH range of between 4.2 and 4.3.

The acidulant of the present teachings can be any acid permitted under applicable regulatory agency rules for use in infant foods. In particular phosphoric acid, citric acid, acetic acid or vinegar, and combinations thereof are suitable for use in an acceptable baby-food preparation. As an alternative to or in addition to such acids, the acidulant can be comprised of a cultured food substance containing lactic acid as illustrated below in Examples 11 and 16, or one or more fruit or vegetable components that contribute acidity to the composition as illustrated below in Examples 4, 14, 15 and 16. Examples of cultured food substances containing lactic acid include, but are not limited to yogurt, sour cream, cottage cheese, sauerkraut and the like. Examples of suitable fruits or vegetables include, but are not limited to apple, apricot, banana, beets, blueberry, carrots, celery, cherry, clementine, cress, elderberry, grape, grapefruit, lemon, mango, orange, papaya, peach, pear, pineapple, plum, raspberry, rhubarb, sorrel, strawberry, sweet potato, tomato, and the like, and combinations thereof. In some configurations, the fruit or vegetable component can be in the form of a puree or juice. The term juice as used herein is intended to include juices and concentrates thereof.

The acid should not make the composition organoleptically unacceptable nor should the acid deleteriously affect the infant in any way. Phosphoric acid, although acceptable in many embodiments, can sometimes be less desirable for use in a baby-food composition of the present teachings because it adds additional phosphorus to the diet, as do the egg-yolk solids. Thus the phosphoric acid can be in amounts such that the total of phosphorus in the composition as a whole does not result in consumption by the infant exceeding the recommended daily intake for phosphorus of 500 mg. For preparations in which the composition as a whole would provide a daily intake of greater than 500 mg phosphorus because the egg-yolk solids or other components in addition to the phosphoric acid contribute excessive amounts of phosphorus, phosphoric acid would not be an acceptable acidulant.

In various embodiments of the present teachings, the acidulant in the form of an added acid can also improve the taste of the composition, particularly, when in combination with a fruit puree or juice in the composition. Thus, the tartness of the acid can tend to provide a balance with fruit components or with added sugar in the composition.

In various embodiments of the present teachings, the baby-food composition does not contain an acidulant and, instead, such compositions are processed to have a smooth Mouthfeel/Texture using a microcutter device. Absence of an acidulant is characterized in that the pH of baby-food compositions not containing an acidulant, can be greater than 4.6 and, in certain embodiments, 5.0 or greater or 6.0 or greater. Numerous microcutter devices suitable for producing a smooth Mouthfeel/Texture are commercially available. Such devices include, for example, Stephan microcutter devices such as Microcut Model Nos. MC-10, MC-12, MC-15, MCH-20, MCH-D-60A, MCH-D-90, MC-100D, MCH-D-100-II, MCH-150, MCH-D-150 and MCH-D-180 (A. Stephan u. Söhne GmbH Co. KG Stephanplatz 2 D-31789 Hameln, Germany); Karl Schnell microcutter devices such as Model Nos. FD 225/130, FD225/100, FD-6, FD2/50 and FD 2/70 (Karl Schnell Inc., P.O. Box 49, New London, Wis.); CFS/Wolfking microcutter devices such as the Wolfking Stainless Steel Microcutter Model MC-225 (CFS B.V., P.O. Box 1, 5760 AA BAKEL, Beekakker 11, 5761 EN BAKEL, The Netherlands); Urschell microcutter devices such as the Urschell Comitrol Processors with micro-cut cutting head, Model Nos. MG-1300, MG-1500, MG-1700 and MG-2100 (Urschel Laboratories, Inc., 2503 Calumet Avenue, Valparaiso, Ind.); Panasonic microcutter devices such as Model Nos. MX-897GM and MX-896™ Microcutter Blender with Stainless steel microcutter blades (Matsushita Electric Industrial Co., Ltd, Home Appliances Group, 2-2-8 Hinode-cho, Toyonaka City, Osaka, Japan 561 0821); the Hamilton Beach BlendMaster blender (234 Spring Rd., Washington, N.C. 27889); and any similar microcutter device so long as the device produces a composition with a smooth Mouthfeel/Texture.

The baby-food compositions of various configurations of the present teachings can contain other ingredients that enhance the acceptability of the composition to an infant. For example, fruit(s) and/or vegetable(s), including purees and juices thereof that serve as acidulants as noted above can also enhance the taste or flavor acceptability of the composition. As also noted above, a juice can serve to add water as can purees to a lesser extent. Both purees and juices can contribute sugars and additional desirable flavor components to the composition. Examples of suitable fruits that can be incorporated in puree or juice form include apples, pears, bananas, pineapples, strawberries, mangos, papayas and the like. Vegetables that can be incorporated in puree form can include sweet potato, beets, carrots, celery and the like.

Additionally, filler substances such as corn starch, rice flour, wheat flour, nonfat dry milk and the like can be included in the composition as can flavoring agents such as sugars, spices and the like. In particular, cinnamon can be included in the composition.

Other substances can additionally be added to a composition to improve the flavor of the composition. For example, zinc salts such as zinc sulfate or zinc chloride can be added to neutralize the sulfurous odor and taste of cooked egg yolk. In addition, the added zinc can provide a nutritionally significant source of zinc. In addition to zinc, other nutritional supplements such as vitamins and/or minerals can also be incorporated into the composition.

In certain embodiments, color agents, processing agents or preservative agents can also be added in order to improve color, taste, shelf life and the like.

Additional components of baby-food compositions within the scope of the present invention can include, for example, pasta preparations, meat preparations such as turkey or beef, other protein-containing foods and the like.

In various embodiments, the formulation can be based upon a whole food concept in which individual constituents conferring various properties on the composition can be prepared foods rather than dried and/or refined substances or artificially prepared substances. The whole foods can be prepared by methods known to skilled artisans such as by cleaning, peeling, and comminuting the whole food or part thereof. Examples of whole food components of baby-food compositions are fruit juices that can be used as a natural source of sugars and vegetables such as white carrots, which can be used as fillers instead of a starch substance (see, for example, U.S. Pat. No. 5,723,166).

The present teachings also provide methods of making the acceptable baby-food compositions described above. The methods involve combining egg-yolk solids, in the form of whole egg yolk or dried egg yolk or the like, with an aqueous liquid, and blending to produce a mixture of smooth consistency. The aqueous liquid can be water or any of a number of fruit juices such as, for example, apple juice, grape juice, orange juice, and the like or vegetable juices such as carrot juice, beet juice, celery juice, tomato juice and the like. If dried egg yolks are used, the aqueous liquid component is in an amount sufficient to disperse adequately the egg-yolk solids in the mixture. The amount of egg-yolk solids in the composition as a whole can be from about 5% to about 25%, from about 6% or 7% to about 25%, from about 10% to about 20%, from about 12% to about 18%, from about 12% to about 13% or about 15%. The method can further comprise adding an acidulant to adjust the pH to a value of about 4.6 or less. The acidulant can be added to the initial mixture or after blending the initial mixture. The acidulant is one that is acceptable for use in a baby-food formulation such as citric acid, phosphoric acid, vinegar or combinations thereof. As an alternative to or in addition to such acids, the acidulant can be comprised of a cultured food substance containing lactic acid as illustrated below in Examples 11 and 16 or one or more fruit or vegetable components that contribute acidity to the composition as illustrated below in Examples 4, 14, 15 and 16.

The blending can be accomplished by manual stirring, a mixing machine, a blender or the like and this step can be performed before or after the addition of any additional ingredients. Such blending mixes the ingredients and ultimately produces a composition of smooth consistency.

Where additional ingredients are added to the composition such as a zinc salt, a fruit or vegetable puree or juice, a spice or a filler substance, such additions can be made at the time the egg-yolk solids and aqueous liquid are combined or at any appropriate time thereafter.

In certain configurations, the blended egg-yolk mixture can be treated to coagulate the protein in the egg-yolk mixture. Coagulation can be accomplished by heating the mixture in a heating device such as an oven, at a temperature of about 170° F. or greater, or at least 175° F. Complete coagulation of the egg protein can be ensured by heating at 180° F. to 190° F. for 5 minutes. Alternative methods can also be used to perform the coagulating, such as, for example, microwaving the mixture.

In some embodiments, coagulated protein can be dispersed by homogenizing the coagulated mixture to a smooth consistency. Such homogenizing can be done, for example by using a blender. A homogenized mixture can be placed in one or more containers, followed by sealing and heating the containers under conditions suitable for producing a shelf-stable composition. Such conditions can be readily determined by the skilled artisan and typically involve retorting for about 30 minutes at either 212° F., for compositions having a pH of 4.6 or lower, or at 250° F. for compositions having a pH greater than 4.6.

INDUSTRIAL APPLICATION

The baby-food compositions of the present invention have application for use as semi-solid preparations for infants which can enhance an infant's cognitive function. The compositions provide nutritionally significant amounts of DHA in the infant's diet, which can be beneficial for cognitive development in the infant. Because the compositions contain a significant amount of egg-yolk solids, they provide a food naturally rich in protein, vitamins and minerals, as well as containing some polyunsaturated fatty acids. When the egg-yolk solids derive from hen's eggs obtained from chickens fed diets high in DHA or DHA precursors, infants fed on the compositions are believed to develop cognitive ability that is at least as good as, and can potentially surpass, cognitive ability of breast-fed infants.

The following examples illustrate certain embodiments of the present application. Other embodiments within the scope of the claims herein will be apparent to one skilled in the art from consideration of the specification and the examples that follow or from practice of the invention as disclosed herein.

The examples, while illustrating embodiments of the present teachings, are not intended to limit the scope of the invention. Moreover, recitation of multiple embodiments having stated features is not intended to exclude other embodiments having additional features, or other embodiments incorporating different combinations of the stated features. Each example is provided for illustrative purposes of how to make and use a compositions or method of the present teachings and, unless explicitly stated otherwise (e.g., through presentation in the past tense), is not intended to be a representation that a given embodiment has, or has not, been made or tested.

EXAMPLE 1

This example illustrates commercial baby-food compositions containing less than 5% or more than 25% egg-yolk solids.

The compositions of old and current products were obtained from the following publications: BEECH-NUT Ingredient Listings from 1977-1985; GERBER Ingredients Publ. 55-8 Rev. 477 and Publ. 55-8 Rev. 785 for ingredients and Publ. 55-85 Rev. 185, Publ. 55-90 Rev. 185, Publ. 55-90 Rev. 681 for nutrient values per 100 grams; and BEECH-NUT Nutritive Values & Ingredient Listing, Publ. 1977, Publ. 10/1983.

Calculations below are based upon an egg yolk containing about 46% total solids, i.e., about 8 grams total egg-yolk solids for a typical 17 gram egg yolk and fat constituting approximately 50 to 55% of total egg solids or about 4 grams of fat per average egg yolk.

Two egg-yolk products containing high amounts of egg yolk were commercially available in the 1970's but are no longer marketed. There were the BEECH-NUT and GERBER "Egg Yolks" products.

The BEECH-NUT "Egg Yolks" product contained egg yolks and water for proper consistency and provided, per 100 grams, 194 calories, 9.6 grams of protein, 18.5 grams of fat and 29.9 grams of total egg-yolk solids. This product contained 65 grams egg yolk per 100 g.

The GERBER "Egg Yolks" product contained egg yolks and water necessary for preparation and provided, per 100 grams, 199 calories, 10.2 grams of protein, 17.4 grams of fat and 29.0 grams of total solids, as egg-yolk solids. It is believed that the BEECH-NUT and GERBER Egg Yolk products are no longer marketed because the compositions were organoleptically unacceptable to babies and as a result were not purchased by the adult caregivers.

BEECH-NUT "Cereal Egg Yolks & Bacon" product contained water, farina, smoked bacon, dried egg yolks, modified cornstarch, nonfat dry milk, oat flour and smoked yeast. This product provided, per 100 grams, 86 calories, 2.3 grams of protein, 5.5 grams of fat, and 15.3 grams of total solids. The content of egg yolk was 3.5% dried egg yolk which contributed 3.33 grams of egg-yolk solids per 100 grams. GERBER "Cereal Egg Yolk Bacon Dinner" contained water, egg-yolk solids, bacon, nonfat dry milk, rice flour, wheat flour, corn flour and sugar. The product provided, per 100 grams, 66 calories, 2.4 grams of protein, 2.8 grams of fat and 13.3 grams of total solids. The amount of egg-yolk solids present was estimated to be about 3 grams of egg-yolk solids per 100 grams and, in any case, less than 5 grams of egg-yolk solids per 100 grams. This calculation is based upon the presumption that the non-egg ingredients including the bacon contribute in part to the fat content of the composition.

GERBER "Cereal & Egg Yolk" contained water necessary for preparation, nonfat milk, egg yolk, wheat flour, corn flour, modified corn starch, sugar and iodized salt.

This product provided, per 100 grams, 55 calories, 2.3 grams of protein, 1.7 grams of fat and 11.8 grams of total solids. The total fat present is 1.7 grams per 100 grams which would be contributed by less than 4 grams of egg-yolk solids per 100 grams.

GERBER and BEECH-NUT desserts contain egg yolks as an ingredient and a total of 1 gram of fat per 100 grams or less, which indicates less than 2 grams of egg-yolk solids per 100 grams.

EXAMPLE 2

This example illustrates the analytical testing of commercial eggs obtained from hens fed diets enriched with DHA or DHA precursors.

Organic eggs from hens fed a DHA-enriching diet were obtained from The Country Hen, Hubbardstown, Mass. 01452 and from Pilgrim's Pride Corporation, Pittsburg, Tex. 73686. For comparative purposes, commercial dried egg yolks from hens not receiving DHA-enriching diet were also analyzed.

Whole eggs were used for convenience and because egg white does not interfere with analytical testing for fatty acids. Fatty acids are present almost exclusively in the yolk and the egg whites contain only negligible amounts of fat.

Standard AOAC analytical methods were used to quantitatively determine the fatty acid content in the whole eggs and in the dried egg-yolk control. (see Shepard, *Lipid Manual, Methodology Appropriate for Fatty Acid-Cholesterol Analysis*, U.S. Food and Drug Administration, Div. of Nutrition, Center for Food Safety and Applied Nutrition, 200 "C" St. SW, Washington, D.C. 20204, September, 1989; *Official Methods of Analysis of the AOAC*, (1995) 16$^{th}$ Ed., Methods 983.23 locator #45.4.02, 969.33 Locator #41.1.28, 994.15 Locator #41.1.35A, and 996.01; Ratnayaka, *J. AOAC International* 78: 783-802, 1995). Briefly the AOAC method used was as follows:

Lipids were extracted and then saponified using alcoholic sodium hydroxide. The fatty acids were then esterified in methanol, with boron trifluoride as catalyst, taken up in heptane and injected on a gas chromatograph with a flame ionization detector. The percentages of individual fatty acid methyl esters were determined from a set of standards containing known concentrations of prepared methyl esters of selected fatty acids. The concentration of each fatty acid methyl ester was calculated as either equivalent triglyceride or fatty acid. Total fatty acids were calculated as the sum of all fatty acids expressed as triglycerides and the value reported as a percentage, i.e., grams per 100 grams of sample. Individual fatty acids were expressed as a percentage of total fatty acids. The analysis was based upon a 2-gram sample and the lowest confidence level for total fatty acids was 0.1% whereas that for individual fatty acids was 0.004%. Results are shown in Table 1.

TABLE 1

|  | Dried Egg Yolk | Country Hen Eggs* | Pilgrim's Pride eggs* |
|---|---|---|---|
| Edible Weight (g) |  | 51.1 | 58.4 |
| Fatty acids (g/100 g) | 49.44 | 7.3 | 9.4 |
| Fatty acids (g/egg) |  | 4.4 | 5.5 |
| DHA (mg/egg) |  | 89.1 | 112.2 |
| Fatty Acid (% of total fatty acids) |  |  |  |
| myristic ($C_{14:0}$) | 0.38 | 0.38 | 0.38 |
| pentadecanoic ($C_{15:0}$) | ‡ | 3.12 | ‡ |
| palmitic ($C_{16:0}$) | 26.04 | 23.41 | 21.40 |
| margaric ($C_{17:0}$) | 0.23 | 0.34 | 0.29 |
| stearic ($C_{18:0}$) | 9.24 | 9.48 | 8.53 |
| palmitoleic ($C_{16:1\omega7}$) | 2.68 | 1.79 | 1.50 |
| margaroleic ($C_{17:1\omega9}$) | 0.17 | ‡ | ‡ |
| elaidic ($C_{18:1\omega9}$) | 0.32 | ‡ | ‡ |
| oleic ($C_{18:1\omega9}$) | 40.61 | 30.0 | 29.63 |
| vaccenic ($C_{18:1\omega7}$) | 1.51 | 1.81 | 1.76 |
| eicosanoic ($C_{20:1\omega9}$) | 0.24 | 0.21 | 0.20 |
| nervonic ($C_{24:1\omega9}$) | ‡ | ‡ | ‡ |
| eicosadienoic ($C_{20:2\omega?}$) | 0.16 | 0.26 | 0.33 |
| linoleic ($C_{18:2\omega6}$) | 12.68 | 22.84 | 27.79 |
| gamma linolenic ($C_{18:3\omega6}$) | 0.10 | ‡ | ‡ |
| homo-gamma-lin ($C_{20:3\omega6}$) | 0.22 | 0.28 | 0.18 |
| arachidonic ($C_{20:4\omega6}$) | 1.76 | 1.28 | 1.42 |
| alpha-linolenic ($C_{18:3\omega3}$) | 0.25 | 1.66 | 2.37 |
| eicosapentaenoic ($C_{20:5\omega3}$) | ‡ | ‡ | 0.17 |
| docosapentaenoic ($C_{22:5\omega3}$) | ‡ | 0.26 | 0.20 |
| docosahexaenoic ($C_{22:6\omega3}$) | 0.40 | 2.05 | 2.04 |
| trans isomers ($C_{18:2}$) | 0.14 | ‡ | ‡ |
| Unknown | 2.22 | 2.75 | 1.22 |

*Values are expressed as means (n = 16 for Country Hen eggs and n = 12 for Pilgrim's Pride eggs)
‡ At or below the detection limit of 0.10%

As can be seen in Table 1, eggs from hens fed a DHA-enriching diet had substantially higher levels of docosahexaenoic acid (DHA) than dried egg yolk from hens not fed a DHA-enriching diet.

EXAMPLE 3

This example illustrates the testing for the amount of water and acid needed in an egg yolk composition suitable for use in a baby food composition.

Six sample compositions were prepared by dispersing varying amounts of dried egg yolk in water at room temperature. A preliminary test of acid requirements was done by adding white vinegar standardized to 5% acidity to sample 7927E to 20% total volume. The samples were placed in a boiling/simmering water bath for about 20 minutes. The samples with greater amounts of dried egg yolk looked like soufflé after cooking. The samples were then blended with a hand blender into a smooth mixture and tasted. The results are shown in Table 2.

TABLE 2

| Sample | Dried Egg yolk (g) | Total weight (g) | Observations |
|---|---|---|---|
| HK7927A | 15.2 | 99.8 | before cooking, very thin; after cooking, very much free fluid. |
| HK7927B | 20.4 | 101.7 | before cooking, very thin; after cooking, very loose. |
| HK7927C | 24.4 | 100.0 | before cooking, very thin; after cooking, soft form. |
| HK7927D | 30.5 | 99.6 | before cooking, thicker than A, B, or C; after cooking, poor taste, unattractive, no specific dislike, except generally distasteful; puffy, texture soft and wet enough to blend. |
| HK7927E | 34.8 + vinegar | 102.9 | before cooking, pretty thick; after cooking, puffy, some vinegar taste but otherwise a nice clean taste; a bit thin after stirring, not overly viscous. |
| HK7927F | 34.9 | 99.4 | before cooking, pretty thick; after cooking, unpleasant taste, nothing specific except generally offensive egg taste; very dry texture, unusable preparation. |

As can be seen from the table, lowering the pH yielded a better physical and organoleptic result. The two best samples, HK7927D and HK7927E, were further evaluated as described below.

EXAMPLE 4

This example illustrates the effects of combining the egg-yolk preparations of Example 3 with a fruit or vegetable puree in the absence or presence of added acid.

Sample HK7927E from Example 3 was mixed with 65 g of sweet potato puree to test a "low acid" food approach.

The HK7927E sample mixed with applesauce was a much smoother product with less egg taste. The mixture of HK7927D with sweet potato puree did not taste as appealing. These results suggest that adding acid in the form of a fruit puree yields a smoother and better tasting composition.

EXAMPLE 5

This Example illustrates the effects of adding varying quantities of vinegar to egg-yolk preparations on pH and physical and organoleptic qualities of the composition.

Twenty grams of dried egg yolk were dispersed in 80 g of water containing 0 to 12.2 grams of white vinegar standardized to 5% acidity. The dispersions were then placed in sealed glass jars in a boiling/simmering water bath for 20 minutes. After cooling, the taste, tartness, texture and mouthfeel were evaluated. The preparations were then filtered through filter paper to get a clearer fluid for pH measurement. The pH was measured with a portable pH meter. The pH values in this example only were corrected for measurement bias using readings obtained from pH 7.01 and pH 4.01 standards so that reported values should be considered indicative rather than precisely accurate. The pH and sensory observations are shown in Table 3.

TABLE 3

| Sample | Vinegar (g) | pH | Observations |
|---|---|---|---|
| HK7928A | 0.0 | 6.26 | Loose scrambled eggs; lots of clear filtrate; little mealy, dry, gritty; no acidity. |
| HK7928B | 3.4 | 4.85 | Creamier than 7928A; slight mealy mouthfeels; no acidity; mildest taste. |
| HK7928C | 6.7 | 4.40 | Very creamy; smooth; slight vinegary but good taste. |
| HK7928D | 9.1 | 4.30 | Not as creamy, strong vinegar taste, too much. |
| HK7928E | 12.2 | 4.17 | Too strong a vinegar taste, very thin, creamy. |

It was concluded that HK7928C was the best of the compositions in this example because it had a smooth, creamy mouthfeel, an acceptable taste and a pH less than 4.6. These results suggested that the optimal acid content when using acetic acid at 5% acidity was 6.7 g per 20 g of dried egg yolk. This calculates to be 1.675 grams of 100% acetic acid per 100 g dried egg yolk, or 28 mEq. This same amount of acid calculated in mEq for citric acid monohydrate, would be about 2 grams citric acid monohydrate per 100 g dried egg yolk.

EXAMPLE 6

This Example illustrates the use of fruit puree to increase the amount of egg yolk that can be incorporated into the food composition and to decrease the amount of added water.

In order to obtain a composition with a higher percentage of egg yolk, 398.2 g of dried egg yolk, 129.5 g of vinegar and 601.1 g of applesauce were combined (dried egg yolk=35.3% of the mixture). The resultant mixture was, however, too thick to get any dispersion of the dried egg yolk into the fluid ingredients. Water was, therefore, added in graded portions until 550 g were added (dried egg yolk=23.7% of the mixture). The ingredients could then be blended into a homogeneous mixture. When this was cooked at 175° F. to 180° F. for about 20 minutes, the mixture became very thick.

Samples of this mixture were transferred to glass jars and cooked in a boiling/simmering water bath for 30 minutes. The resulting food, coded HK7001A, was a very thick and dry; it was not a puree; and it was judged to be less desirable than formulations in examples 3-5 using lesser amounts of egg-yolk solids.

A 500 g portion of the mixture was combined with an additional 100 g of applesauce (dried egg yolk=19.8% of the mixture), blended for homogeneity and samples placed in glass jars and cooked in a boiling/simmering water bath for 30 minutes. The resulting food, coded HK7001B, was still thick and pasty, but was showing a more appealing flavor and texture. Thus, in certain embodiments, in order to use the addition of fruit to achieve a more appealing flavor, the egg-yolk solids can comprise 20% or less of the mixture.

Examples 3-6 show that an acceptable approach for preparing a composition containing egg yolk requires having enough water and acid in the initial mixture to disperse the dried egg yolks upon blending; blending the mixture to get a smooth dispersion with no lumps; coagulating the egg yolk by cooking the acidified egg-yolk dispersion at a temperature greater than 170° F. (perhaps greater than 175° F.); and blending the heated dispersion containing the coagulated egg yolk to make a smooth dispersion prior to the final sterilization. Optionally, fruit can be added to improve the flavor.

EXAMPLE 7

This example illustrates a two-phase process for preparing a composition containing 13% dried egg yolks (equivalent 27% whole egg yolks) and fruit.

Using egg yolks containing 12 mg DHA per gram egg-yolk solids, a baby-food preparation containing about 13% dried egg yolk in a 113-gram (4-ounce) jar of a baby-food preparation will provide 150 mg of DHA in 100 grams of baby food. The following process was, therefore, designed to prepare a baby-food composition containing 13% dried egg yolk.

This process involved mixing about 35% dried egg yolks with citric acid monohydrate and then heating the mixture to greater than 175° F. (80° C.) to denature, i.e. coagulate, the egg-yolk protein (Phase I). This phase I composition was then mixed with various fruit purees and the resulting organoleptic characteristics assessed.

For the first phase, a master batch of the Phase I Egg-Yolk Preparation was prepared with 400 g of dried egg yolks, 8 g of citric acid and 730 g of water. The water was added to a large stainless steel bowl. The citric acid was dissolved in the water and then the dried egg yolks were added. The larger lumps of egg were broken up with a spoon and then the mixture was made into a smooth homogeneous dispersion with a BRAUN MULTIMIXER blender. The dried egg-yolk level was 35.15% of the Phase I Egg-Yolk Preparation.

The bowl was then placed atop a pot with boiling water as a double boiler. The temperature of the egg-yolk dispersion was brought to 175° F. to 185° F. The dispersion became thick with this heating, so it was blended several times to disperse the coagulated egg. The egg in contact with the hot surface of the bowl was more prone to coagulate due to the higher local temperature.

The dispersion lost about 58 g of water due to evaporation, which was replaced after the dispersion was removed from the heat and then blended into the dispersion. Afterwards, one sample was placed in a glass jar, sealed and cooked in a boiling water bath for 30 minutes. The remaining Phase I dispersion was refrigerated and held for blending in Phase II.

For Phase II, BEECH-NUT baby fruit puree heated to 150° F., 315 g, was blended with 185 g of the Phase I Egg-Yolk Preparation, to yield 13.0% dried egg yolk in the mixtures. Samples were placed in glass jars, sealed and heated in a boiling/simmering bath for 30 to 35 minutes. The three samples produced as shown in Table 4:

TABLE 4

| Sample | pH | Fruit Puree Source | BEECH-NUT Product Code |
|---|---|---|---|
| HK7005A | 4.19 | BEECH-NUT Stage 3 Pears | 6806C1103 |
| HK7005B | 4.15 | BEECH-NUT Stage 2 Peaches & Bananas | 7611C1102 |
| HK7005C | 4.02 | BEECH-NUT Stage 2 Pears & Raspberries | 7616E1522/24 |

Three jars of each sample were submitted for taste testing. As shown in Table 5, the preparations were reported to taste sour and to be not very palatable.

TABLE 5

| Samples | Flavor Evaluation (5 evaluators) | | |
|---|---|---|---|
| HK7005A | 3 - not good | 1 - okay | 1 - "funny taste" |
| HK7005B | 4 - okay | 1 - not good | |
| HK7005C | 4 - not good | 1 - okay | |

EXAMPLE 7

This example illustrates the preparation of a low-acid egg-yolk composition using sweet potato puree.

The composition in this example (HK7026) was prepared using the following components in the percentages given as volume percent: sweet potato puree, 55% (BEECH-NUT Stage 3 Sweet Potatoes, 7313B0755); dried egg yolks, 15%; heavy cream, 5% (40% fat; ingredients milk and cream); ground cinnamon, 0.1%; and water, 24.9% (warm, about 120 degrees). The water, heavy cream, warmed sweet potato puree, and cinnamon were combined in a blender bowl and the dried egg yolk was added. The mixture was blended and the egg yolk was easily dispersed in one minute.

The mixture was then transferred to a double boiler and heated to 180° F. with stirring. The coagulated material was then blended to produce a fine dispersion which was readily achieved. The puree was transferred to small Mason jars and retorted for 60 minutes at 15 psig using a home pressure cooker.

The resultant puree had a dried-out, curdled appearance suggesting that it may have lost some liquid in the pressure cooking process. It is possible that a lower level of heavy cream such as 2.5% could diminish the apparent drying out of the puree. The combination of heating in the home pressure cooker and air entrapment in the purees resulted in textures that were undesirable in appearance. The pH after processing was 5.41.

The process was replicated in a pilot plant, however, again the product appeared curdled and undesirable in appearance in the jar. Because in previous work, adding zinc salt reduced the sulfurous odor and taste of cooked egg yolk, zinc chloride was added to the composition prepared in the pilot plant. As a result the pilot plant preparation had no egg-like taste or smell.

EXAMPLE 8

This example illustrates the effects of adding the acidulant, phosphoric acid, on organoleptic properties of the composition.

Four test kitchen samples were prepared containing 15% dried egg yolks, 6% medium grain rice flour and 0.011% zinc chloride. The effect of step-wise addition of phosphoric acid acidulant on product appearance and taste was then assessed. The ingredients were combined with water and blended to a smooth consistency, the pH was adjusted with phosphoric acid to between 6.15 and 4.15 and the mixture heated to 190° F. to coagulate the egg protein. The mixture was then blended again to a smooth consistency and retorted for 50 min at 250° F. for preparations having a pH greater than 4.6 and at 212° F. for preparations having a pH less than 4.6. The samples were tested for titratable acidity (post processing), pH (before and after processing) and for color using a Hunterlab colorimeter. The Hunterlab colorimeter quantifies reflectance on an L, a, and b coordinate system. The L coordinate axis measures luminosity on a scale increasing from darkness-to-lightness;

the a axis measures increasing values on a continuum from green to red; and the b axis measures increasing values on a continuum from blue to yellow. The results are shown in Table 6.

TABLE 6

|  | TK141A | TK141B | TK141C | TK141D |
|---|---|---|---|---|
| Dried Egg Yolk, % | 15.00 | 15.00 | 15.00 | 15.00 |
| Rice Flour, % | 6.00 | 6.00 | 6.00 | 6.00 |
| Acid added | None | phosphoric | phosphoric | Phosphoric |
| Acid-added % | 0.00 | 0.12 | 0.19 | 0.38 |
| Titratable acidity, % | 0.082 | 0.250 | 0.329 | 0.534 |
| Unprocessed pH | 6.15 | 5.10 | 4.70 | 4.15 |
| Processed pH | 5.93 | 5.13 | 4.75 | 4.25 |
| Retort temperature, °F. | 250 | 250 | 250 | 212 |
| Hunterlab "L" | 63.79 | 66.78 | 68.82 | 78.71 |
| Hunterlab "a" | 3.79 | 5.06 | 4.59 | 0.28 |
| Hunterlab "b" | 23.10 | 24.76 | 24.39 | 23.35 |

Sample TK141D had the lightest color (highest Hunterlab L value), probably because of the lower retorting temperature of 212° F.

Samples TK141B, TK141C and TK141D were found to have a smoother texture than sample TK141A. The samples were then tested for organoleptic acceptability. The observations are summarized below:

Sensory Evaluation

TK141A
Appearance in the jar (unopened): heavily curdled, water separation, starch separated, hard plug, dark, and starch gel surrounds plug
Appearance on opening: slimy look on top, plug shrunken away from glass
Odor/smell upon opening: slight cooked egg odor
Appearance on mixing: looks terrible, starch glistening, darkish
Mouthfeel: slightly gritty (better than it looked but well-stirred)
Taste: bland, slight cooked egg taste
TK141B
Appearance in the jar (unopened): finer curd, softer plug, sloppy starch glop at bottom, slightly lighter
Appearance on opening: curdled top, grainy surface
Odor/smell upon opening: cooked egg odor
Appearance on mixing: very curdled and grainy, not attractive, lighter color than A
Mouthfeel: grainy, particles softer than A
Taste: bland, cooked egg taste
TK141C
Appearance in the jar (unopened): much finer curd, yellow, less dark, and some starch separation, water separation, soft plug
Appearance on opening: nice yellow color, egg salad textural appearance, flows like baby food, soft plug
Odor/smell upon opening: slight cooked egg odor
Appearance on mixing: grainy, starch gel pieces
Mouthfeel: soft, smooth despite visual appearance of lumps
Taste: slightly tart, not bad
TK141D
Appearance in the jar (unopened): light yellow (great color), looks like some air bubbles with no obvious curd, no water or starch separation
Appearance on opening: skin on top, creamy color (more white/less yellow)
Odor/smell upon opening: very slight cooked egg odor
Appearance on mixing: viscous, very thick, grainy, not bad
Mouthfeel: very smooth
Taste: moderately tart, not bad It was concluded from this experiment that acidification improves mouthfeel and appearance, in particular, the color of the composition. Reducing the pH to less than pH 4.6 permitted retorting at 212° F. in the sterilization process and this is apparently why the color of TK141D was much lighter than the other preparations as indicated by the higher Hunterlab L value.

EXAMPLE 9

The following example illustrates the comparison of three food acid acidulants, phosphoric acid, citric acid and vinegar, which are generally recognized as safe for use in baby-food preparations by the U.S. Food and Drug Administration.

Except for the acidulant, compositions were prepared according to the formulations in Example 8 to contain 15% dried egg yolks, 6% medium grain rice flour and 0.011% zinc chloride. The acidulants used were 85% phosphoric acid, citric acid monohydrate or vinegar standardized to 5% acidity. The pH of the compositions was adjusted to approximately pH 4.15. The ingredients were combined with water and blended to a smooth consistency, the pH was adjusted to pH 4.15 to 4.20 with the appropriate acid and the mixture was heated to 180° F. for 5 minutes to coagulate the egg protein. The mixtures were then blended again to a smooth consistency and retorted at 212° F. for 50 minutes.

Experimental samples were evaluated for Flavor and Mouthfeel/Texture on a standard nine-point hedonic scale. The scale is as follows:

| Score/rating | Std. Hedonic Scale |
|---|---|
| 9 | I like extremely |
| 8 | I like very much |
| 7 | I like moderately |
| 6 | I like slightly |
| 5 | I neither like nor dislike |
| 4 | I dislike slightly |
| 3 | I dislike moderately |
| 2 | I dislike very much |
| 1 | I dislike extremely |

The results are shown in Table 7.

TABLE 7

|  | TK141D | TK159A | TK159B | TK159C |
|---|---|---|---|---|
| Dried Egg Yolk, % | 15.00 | 15.00 | 15.00 | 15.00 |
| Rice Flour, % | 6.00 | 6.00 | 6.00 | 6.00 |
| Acid Added | phosphoric | phosphoric | citric | vinegar |
| Acid added, % | 0.38 | 0.37 | 0.39 | 10.64 |
| Unprocessed pH | 4.15 | 4.16 | 4.15 | 4.17 |
| Processed pH | 4.25 | 4.28 | 4.25 | 4.27 |
| Retort temperature, °F. | 212 | 212 | 212 | 212 |
| Hunterlab "L" | 78.71 | 74.75 | 74.06 | 76.55 |
| Hunterlab "a" | 0.28 | 1.08 | 1.10 | 0.81 |
| Hunterlab "b" | 23.35 | 23.87 | 25.16 | 23.47 |
| Flavor (nine-point scale) | 2.05 | 2.89 | 2.44 | 1.22 |
| Mouthfeel/Texture (nine-point scale) | 3.84 | 5.66 | 6.67 | 6.33 |

As shown in the table, TK159C, made with white vinegar, had the worst taste. Phosphoric acid and citric acid were roughly similar on taste and citric acid may be slightly better for mouthfeel. Samples made with all three acids, which were retorted at 212° F., had good light yellow colors.

Although sample TK159A containing phosphoric acid was most acceptable on taste, in certain embodiments citric acid can be used as the acidulant rather than phosphoric acid. TK141D contained 0.38% phosphoric acid and TK159A contained 0.37% phosphoric acid. Since 85% phosphoric acid contains about 26% phosphorus, these two samples would contain about 112 milligrams of added phosphorus in a four-ounce jar (0.38%=380 mg %; 380 mg/100 g×113 g×0.26% P=112 mg P/jar). Egg yolks already contain about 100 milligrams of phosphorus per medium egg yolk, which weighs 17 g. A 15% dried egg-yolk composition contains the equivalent of 30% liquid egg yolk, or 33.9 g (two egg yolks) per four-ounce (113 gram) jar, which supply 200 mg of phosphorus just from the two egg yolks. The recommended daily intake (RDI) for phosphorus for the infant is 500 mg, so a food acidified with phosphoric acid can provide 60% of the recommended daily intake ("RDI") of phosphorus. Food acidified with any other acid can still provide 40% of the phosphorus RDI, derived from the egg yolk alone.

EXAMPLE 10

This example illustrates the effect of retort temperature and sugar content on the organoleptic properties of compositions.

Except for the acidulant used, compositions were prepared according to the formulations in Example 8 to contain 15% dried egg yolks, 6% medium grain rice flour and 0.011% zinc chloride. Where required, citric acid was used to adjust to pH and table sugar was added at 9%. The ingredients were combined with water and blended to a smooth consistency, the pH was adjusted with citric acid monohydrate to pH 4.15 to 4.20 and the mixture was heated to 180° F. for 5 minutes to coagulate the egg protein, blended again to a smooth consistency and retorted for 50 minutes at either 250° F. or 212° F. In order to assess the effect of temperature on the compositions, TK162B and TK159B, which were otherwise equivalent preparations, were retorted at 250° F., and 212° F. respectively. Because the pH of the composition determines the required retort temperature, i.e., compositions having a pH greater 4.6 need to be retorted at 250° F. and compositions having a pH of 4.6 or less need only to be retorted at 212° F., reference composition TK141A having pH of about 6 was compared to composition TK162B in order to compare the combined effects of added acid and retort temperature on organoleptic characteristics of the compositions. Finally, composition TK162C was prepared in the same manner as TK159B except that 9% sugar was added to test the effect on organoleptic characteristics of the composition. The results are shown in Table 8.

TABLE 8

|  | TK141A | TK162B | TK159B | TK162C |
|---|---|---|---|---|
| Dried Egg Yolk, % | 15.00 | 15.00 | 15.00 | 15.00 |
| Rice Flour, % | 6.00 | 6.00 | 6.00 | 6.00 |
| Sugar, % | none | none | none | 9.00 |
| Acid added, % | none | citric (0.38) | citric (0.39) | citric (0.38) |
| Unprocessed pH | 6.15 | 4.15 | 4.15 | 4.15 |
| Processed pH | 5.93 | 4.25 | 4.25 | 4.25 |
| Retort temperature, ° F. | 250 | 250 | 212 | 212 |
| Hunterlab "L" | 63.79 | 68.65 | 74.06 | 73.11 |
| Hunterlab "a" | 3.79 | 4.87 | 1.10 | 1.71 |
| Hunterlab "b" | 23.10 | 24.80 | 25.16 | 25.32 |
| Flavor (nine-point scale) | 3.84 | 1.95 | 2.44 | 4.86 |
| Mouthfeel/Texture nine-point scale) | 4.53 | 4.00 | 6.67 | 6.64 |

The results from these compositions show that acidifying the composition detracts from flavor by introducing a strong tartness but enhances color retention, even when the acidified sample is retorted at 250° F. Retorting at a lower temperature is most favorable for maintaining a light color, i.e., higher Hunterlab "L" values. Processing at a lower temperature also favors a better mouthfeel and texture. The experiment above further shows that flavor can be improved by adding sugar to balance the added acid. The 9% sugar level in this model system yielded a relatively neutral flavor score of 4.86.

EXAMPLE 11

This example illustrates baby-food compositions containing 15% dried egg yolk, citric acid monohydrate as acidulant, zinc chloride and various fruit purees or juices as sugar sources.

The compositions in this example were prepared essentially as described above in examples 3-10 which was, briefly, as follows. All ingredients except the citric acid were combined and blended together. The pH was then determined and adjusted to pH 4.25 or less with citric acid. The mixture was then transferred to a double boiler and heated to 170° F. to 180° F. to coagulate the egg protein. The hot mixture was then blended again until smooth and filled at 150° F. into glass jars which were capped and processed for 50 to 55 minutes at the indicated temperature. The compositions were as shown in Table 9.

TABLE 9

| Ingredient | TK152 | TK153A | TK153B | TK153C | TK154B | TK154C | TK155 |
|---|---|---|---|---|---|---|---|
| Dried Egg Yolk | 15.00 | 15.00 | 15.00 | 15.00 | 15.00 | 15.00 | 15.00 |
| Apple Puree | — | 55.00 | 58.00 | 55.00 | — | — | 25.00 |
| Pear Puree | — | — | — | — | 57.00 | 59.00 | — |
| Sweet Potato puree | — | — | — | — | — | — | 25.00 |
| Yogurt | 25.00 | — | — | — | — | — | 15.00 |
| Grape jc. Conc. | 10.00 | — | — | — | 5.00 | 3.00 | — |
| Apple jc. Conc. | — | 7.00 | 7.00 | 7.00 | — | — | 10.00 |

TABLE 9-continued

| Ingredient | TK152 | TK153A | TK153B | TK153C | TK154B | TK154C | TK155 |
|---|---|---|---|---|---|---|---|
| Rice flour, med. Grain | 3.00 | 3.00 | — | 3.00 | 3.00 | 3.00 | 3.00 |
| Cinnamon | — | — | — | 0.045 | — | — | — |
| Zinc chloride | 0.011 | 0.011 | 0.011 | 0.011 | 0.011 | 0.011 | 0.011 |
| Citric acid to: | pH 4.23 | pH 4.23 | pH 4.26 | pH 4.26 | pH 4.24 | pH 4.23 | pH 4.25 |
| Water | q.s. 100 | q.s. 100 | q.s. 100 | q.s. 100 | q.s. 100 | q.s. 100 | q.s. 100 |
| Retort temp. °F. | 250° F. | 212° F. | 212° F. | 212° F. | 212° F. | 212° F. | 212° F. |
| Titratable acid, % | — | 0.414 | 0.437 | 0.560 | 0.515 | 0.469 | 0.810 |
| Total sugars, % | — | 7.7 | 8.9 | 7.3 | 5.9 | 4.8 | 7.7 |

Composition TK153C was judged the best on flavor, which is probably due to the additional cinnamon flavor notes which effectively neutralized the cooked egg-yolk flavors.

EXAMPLE 12

This example illustrates further testing of composition TK153C for organoleptic acceptability.

TK153C was prepared as described in Example 11 and coded as TK163 for organoleptic analysis by a trained panel of 22 panelists using a nine-point hedonic scale as described in Example 9. TK163 was evaluated for Appearance/Color, Flavor and Mouthfeel/Texture on a nine-point scale hedonic scale. The results are shown in Table 10 below.

TABLE 10

| Attribute | Mean Value |
|---|---|
| Appearance/Color | 5.95 |
| Flavor | 5.95 |
| Mouthfeel/Texture | 6.23 |

Since the average hedonic score was above neutral for each of the three tested organoleptic characteristics, sample TK163 was deemed to be an organoleptically acceptable baby-food preparation containing 15% dried egg yolk.

EXAMPLE 13

This example illustrates a testing procedure that could be used to determine the organoleptic acceptability of baby-food composition to infants in certain embodiments of the present teachings.

Informed consent would be obtained from the parents of the infants involved in the study. Testing would be in a double-blind, randomized controlled study. Approximately 10 full-term infants of ages from about 4 months to about one year would be fed a series of baby-food composition including a composition containing egg yolk and a control standard baby-food composition known to be accepted by infants. This control composition could serve as a, reference for organoleptic acceptability. The baby-food compositions could be prepared, for example, by the methods identified in Examples 3-12 above.

General data on the infants would be obtained and recorded such as age and weight. In addition, background information would be obtained from the parent which would generally identify food preferences or aversions as well as eating habits of the family of the test infant. Subjects would be randomly assigned to one of the two feeding groups. The test would involve feeding of the infant by the adult parent. The parent would record the acceptability and tolerance of the infant toward the baby food including amount offered, amount consumed and amount refused by the babies. All digestive problems, such as vomiting, spitting up, and diarrhea would be noted. Acceptability would be scored by the mothers in a questionnaire which uses a nine-point hedonic scale as illustrated in Example 9 above (see also Stone and Sidel, Sensory Evaluation Practices, Academic Press, Inc., Orlando, 1985, pp. 58-86). The mothers would indicate acceptance or aversion based on the responses of the infants to the food. The results would then be analyzed and egg-yolk compositions showing acceptance comparable to or greater than that of standard baby food would be considered suitable for use as an infant food.

EXAMPLE 14

This example illustrates an egg yolk containing composition of peaches, oatmeal and cinnamon in which the acidulant is comprised of an acidic fruit component of peach puree and white grape juice along with ascorbic acid.

This study, identified as PP6300, was a pilot plant scale up of an earlier Test Kitchen sample, TK341C. TK341C was evaluated by a panel of five (5) tasters and found to have an acceptable taste.

Single-strength peach puree, 82.5 lb., was added to a kettle equipped with a swept-surface heating capability. The puree was heated to a temperature of 160° F. to 170° F. using the hot water jacket. Fifty-five (55) pounds of this hot peach puree were weighed and transferred to a second kettle.

Ferrous sulfate heptahydrate, 0.03 lb. (13.62 g), and citric acid, 0.02 lb. (9.08 grams), were dissolved in a portion of the batch water to form a complex of ferrous iron and citric acid. Seven pounds of white grape juice concentrate, 6.67 lb. of dried egg-yolk powder, 2.0 lb. of oat flakes, 0.04 lb. of ascorbic acid, 0.45 lb. of ground cinnamon, 0.02 lb. (9.08 g) of vitamin premix and 0.011 lb. (5.0 g) of zinc sulfate were added to 18.07 lb. of batch water in the second kettle containing 55 pounds of peach puree and made into a slurry with the hot peach puree. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 4.04. The peach puree and white grape juice concentrate contributed sufficient acidity so that addition of a specific acidulant was unnecessary. The slurry was heated to a temperature of 180° F. to 190° F. by steam injection, adding about 10 lb. of water to the batch via condensation. The slurry was passed twice through a Stephan Microcutter, Model No. MC-12, equipped with a 0.05-0.10 mm ring and strained through a 0.033" screen.

The product was filled into 113-gram glass jars at a temperature of 150° F. The jars were then capped and thermally processed in a retort at 212° F. for 30 minutes to achieve pasteurization in accordance with 21 C.F.R. §114 et seq. "Acidified Foods." The pH of PP6300 on the day after processing was 4.34.

EXAMPLE 15

This example illustrates pilot plant production of an egg yolk containing chicken lasagna composition (PP6327) in which the acidulant is comprised of tomato puree.

Water was heated in an open kettle to 200° F. and 11.25 lb. of mafalda pasta was blanched therein for 10 minutes to achieve hydration. The blanched pasta was then drained and rinsed with cold water. The weight of the blanched pasta was 26.65 lb.

Forty and one-quarter lb. of frozen carrot pieces were placed in a Fitzpatrick Comminutor, Model No. D, at medium speed and an exit temperature of 180° F. to 200° F. (190° F. target). Approximately 6 lb. of water were added through steam injection, resulting in a total puree weight of 47 lb. The spinning knives in the Comminutor and the injected steam comminuted the carrots into a puree that passes through a 3/16" or 1/4" screen.

The slurry was passed through a Stephan Microcutter, Model No. MC-12, equipped with a blank ring and transferred to a Koven kettle. After additional mixing, the pH was measured and found to be pH 5.0 due to the acidity contributed by the tomato paste. The slurry was heated to a temperature of 180° F. to 190° F. by steam injection, adding about 30 lb. of water to the batch via condensation. The slurry was passed twice through a Stephan Microcutter, Model No. MC-12 equipped with a 0.05-0.10 mm ring and strained through a 0.033" screen.

The product was filled into 113-gram glass jars at a temperature of 170° F. The jars were then capped and thermally processed in a retort at 250° F. for 45 minutes as required by 21 C.F.R. §113 et seq. "Thermally Processed Low-Acid Foods Packaged in Hermetically Sealed Containers." The pH of PP6327 on the day after processing was 4.96.

PP6327 was evaluated by a trained individual for Flavor on a nine-point scale. A score of "5" means "I neither like nor dislike" and a score of "6" means "I like slightly." PP6327 was given a score of "6" on this Flavor scale.

EXAMPLE 16

This example illustrates pilot plant production of an egg yolk containing pear berry medley composition (PP6331) in which the acidulant is comprised of pear puree, white grape juice, red raspberry puree, elderberry juice concentrate and ascorbic acid.

This study was a pilot plant scale up of an earlier Test Kitchen sample, TK337C. TK337C was evaluated by a panel of five (5) tasters and found to have a highly acceptable taste by all five tasters.

Single-strength pear puree, 125 lb., was added to a kettle equipped with a swept-surface heating capability. The puree was heated to a temperature of 160° F. to 170° F. using the hot water jacket. One hundred and eleven pounds of this hot pear puree were weighed and transferred to a second Kettle.

Twenty-five pounds of white grape juice concentrate, 16.68 lb. of dried egg-yolk powder, 20.0 lb. of red raspberry puree, 14.0 lb. of heavy cream, 12.5 lb. of full-fat yogurt, 8.75 lb. of medium grain rice flour, 7.5 lb. of fresh whole milk, 3.75 lb. of elderberry juice concentrate, 0.1 lb. of ascorbic acid, 0.0275 lb. of zinc sulfate were added to the pear puree and 13.2 lb. of batch water in the second kettle and mixed into a slurry.

The slurry was passed through a Stephan Microcutter, Model No. MC-12, equipped with a blank ring and transferred to a Koven kettle. After additional mixing, the pH was measured and found to be pH 4.14. The acidic nature of the peach puree and white grape juice concentrate created sufficient acidity so that addition of a specific acidulant was unnecessary. The slurry was heated to a temperature of 180° F. to 190° F. by steam injection, adding about 17.5 lb. of water to the batch via condensation. The slurry was passed twice through a Stephan Microcutter, Model No. MC-12, equipped with a 0.05-0.10 mm ring and strained through a 0.033" screen.

The product was filled into 113-gram glass jars at a temperature of 150° F. The jars were then capped and thermally processed in a retort at 212° F. for 30 minutes to achieve pasteurization in accordance with 21 C.F.R. §114 et seq. "Acidified Foods." The pH of PP6331 on the day after processing was 4.08.

EXAMPLE 17

This example illustrates a DHA-enriched egg yolk-containing composition of "rice cereal & apples." This composition, identified as PP6685, was produced in a pilot plant.

Single-strength apple puree, 55 lb., was added to a kettle equipped with a swept-surface heating capability. The puree was heated to a temperature of 160° F. to 170° F. using the hot water jacket.

Seven pounds of apple juice concentrate, 12.0 lb. of DHA-enriched dried egg-yolk powder, 2.0 lb. of medium grain rice flour, 0.04 lb. of ascorbic acid, 0.045 lb. of ground cinnamon, 0.02 lb. (9.08 g) of vitamin premix, and 0.011 lb. (5.0 g) of zinc sulfate were mixed with 17 lb. of batch water and the 55 pounds of hot apple puree. Ferrous sulfate heptahydrate, 0.03 lb. (13.62 g), and citric acid, 0.02 lb. (9.08 grams), were dissolved in a portion of the batch water to form a complex of ferrous iron and citric acid. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 4.18. Forty grams of citric acid were added to achieve a pH less than 4.05. The slurry was heated to a temperature of 190° F. by steam injection; about 6.84 lb. of water were added to the batch via condensation of the steam. The slurry was made to 100 lb. by adding 6.6 lb. of water. The slurry was passed twice through a Stephan Microcutter, Model No. MC-12, equipped with a 0.05-0.10 mm ring, and then was strained through a 0.033 inch screen.

The product was filled into 113-gram glass jars at a temperature of 132° F. The jars were then capped and thermally processed in a retort at 212° F. for 30 minutes to achieve pasteurization in accordance with 21 C.F.R. §114 et seq. "Acidified Foods." The pH of PP6685 on the day after processing was 4.00.

EXAMPLE 18

This example illustrates a control composition of "rice cereal & apples" that contained no egg yolk. This composition, identified as PP6684, was produced in the pilot plant.

Single-strength apple puree, 60 lb., was added to a kettle equipped with a swept-surface heating capability. The puree was heated to a temperature of 160° F. to 170° F. using the hot water jacket.

Seven pounds of apple juice concentrate, 6.0 lb. of medium grain rice flour, 0.04 lb. of ascorbic acid, 0.045 lb. of ground cinnamon, 0.02 lb. (9.08 g) of vitamin premix, and 0.011 lb. (5.0 g) of zinc sulfate were mixed with 20 lb. of batch water and the 55 pounds of hot apple puree. Ferrous sulfate heptahydrate, 0.03 lb. (13.62 g), and citric acid, 0.02 lb. (9.08 grams), were dissolved in a portion of the batch water to form a complex of ferrous iron and citric acid. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 3.48. The acidic nature of the apple puree and apple juice concentrate created sufficient acidity so that addition of a specific acidulant was unnecessary. The slurry was heated to a temperature of 190° F. by steam injection, adding about 6.84 lb. of water to the batch via condensation of the steam. The slurry was made to 100 lb. by adding 1.0 lb. of water. The slurry was passed twice through a Stephan Microcutter, Model No. MC-12, equipped with a 0.05-0.10 mm ring, and then was strained through a 0.033" screen.

The product was filled into 113-gram glass jars at a temperature of 140° F. The jars were then capped and thermally processed in a retort at 212° F. for 30 minutes to achieve pasteurization in accordance with 21 C.F.R. §114 et seq. "Acidified Foods." The pH of PP6684 on the day after processing was 3.50.

EXAMPLE 19

This example illustrates a DHA-enriched egg yolk-containing composition of "oatmeal & pears." This composition, identified as PP6687, was produced in a pilot plant.

Single-strength pear puree, 60 lb., was added to a kettle equipped with a swept-surface heating capability. The puree was heated to a temperature of 160° F. to 170° F. using the hot water jacket.

Seven pounds of pear juice concentrate, 12.0 lb. of DHA-enriched dried egg yolk powder, 2.0 lb. of baby oat flakes, 0.50 lb. of frozen blanched ginger, 0.04 lb. of ascorbic acid, 0.02 lb. (9.08 g) of vitamin premix, and 0.011 lb. (5.0 g) of zinc sulfate were mixed with 12 lb. of batch water and the 60 pounds of hot pear puree. Ferrous sulfate heptahydrate, 0.03 lb. (13.62 g), and citric acid, 0.02 lb. (9.08 grams), were dissolved in a portion of the batch water to form a complex of ferrous iron and citric acid. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 4.17. Forty-five grams of citric acid were added to achieve an unprocessed pH less than 4.05. The slurry was heated to a temperature of 190° F. by steam injection, adding about 6.44 lb. of water to the batch via condensation of the steam. The slurry was made to 100 lb. by adding 5.6 lb. of water. The slurry was passed twice through a Stephan Microcutter, Model No. MC-12, equipped with a 0.05-0.10 mm ring, and then was strained through a 0.033 inch screen.

The product was filled into 113-gram glass jars at a temperature of 113° F. The jars were then capped and thermally processed in a retort at 212° F. for 30 minutes to achieve pasteurization in accordance with 21 C.F.R. §114 et seq., "Acidified Foods." The pH of PP6687 on the day after processing was 4.09.

EXAMPLE 20

This example illustrates a control composition of "oatmeal & pears" that was free of egg yolk. This composition, identified as PP6686, was produced in the pilot plant.

Single-strength pear puree, 60 lb., was added to a kettle equipped with a swept-surface heating capability. The puree was heated to a temperature of 160° F. to 170° F. using the hot water jacket.

Seven pounds of pear juice concentrate, 6.0 lb. of baby oat flakes, 0.04 lb. of ascorbic acid, 0.50 lb. of frozen blanched ginger, 0.02 lb. (9.08 g) of vitamin premix, and 0.011 lb. (5.0 g) of zinc sulfate were mixed with 20 lb. of batch water and the 60 pounds of hot pear puree. Ferrous sulfate heptahydrate, 0.03 lb. (13.62 g), and citric acid, 0.02 lb. (9.08 grams), were dissolved in a portion of the batch water to form a complex of ferrous iron and citric acid. The ferrous sulfate-citric acid solution was added and mixing was continued.

The slurry was passed through a Stephan Microcutter, Model No. MC-12, equipped with a blank ring and transferred to a Koven kettle. After additional mixing, the pH was measured and found to be pH 3.71. The acidic nature of the pear puree and pear juice concentrate created sufficient acidity so that addition of a specific acidulant was unnecessary. The slurry was heated to a temperature of 190° F. by steam injection, adding about 6.38 lb. of water to the batch via condensation of the steam. The slurry was made to 100 lb. by adding 2.0 lb. of water. The slurry was passed twice through a Stephan Microcutter, Model No. MC-12, equipped with a 0.05-0.10 mm ring, and then was strained through a 0.033" screen.

The product was filled into 113-gram glass jars at a temperature of 133° F. The jars were then capped and thermally processed in a retort at 212° F. for 30 minutes to achieve pasteurization in accordance with 21 C.F.R. §114 et seq. "Acidified Foods." The pH of PP6686 on the day after processing was 3.78.

EXAMPLE 21

This example illustrates a DHA-enriched egg yolk-containing composition of "pear berry medley." This composition, identified as PP6690, was produced in a pilot plant.

Single-strength pear puree was added to a kettle equipped with a swept-surface heating capability. The puree was heated to a temperature of 160° F. to 180° F. using the hot water jacket. Hot pear puree, 44.4 lb., was weighed and transferred to a second kettle. Ten pounds of white grape juice concentrate, 12.0 lb. of dried egg yolk powder, 10.0 lb. of red raspberry puree, 5.6 lb. of heavy cream, 5.0 lb. of full fat yogurt, 0.8 lb. of medium grain rice flour, 3.0 lb. of fresh whole milk, 2.0 lb. of elderberry juice concentrate, 0.04 lb. of ascorbic acid, and 0.01 lb. of zinc sulfate were added to the pear puree and mixed into a slurry.

The slurry was passed through a Stephan Microcutter, Model No. MC-12, equipped with a blank ring and transferred to a Koven kettle. After additional mixing, the pH was measured and found to be pH 4.28. Seventy-five grams of citric acid were added to achieve an unprocessed pH less than 4.15. The slurry was heated to a temperature of 180° F. to 185° F. by steam injection, adding about 7.2 lb. of water to the batch via condensation of the steam. The slurry was made to 100 lb. by adding 2.6 lb. of water. The slurry was passed twice through a Stephan Microcutter, Model No. MC-12, equipped with a 0.05-0.10 mm ring, and strained through a 0.033 inch screen.

The product was filled into 113-gram glass jars at a temperature of 133° F. The jars were then capped and thermally processed in a retort at 212° F. for 30 minutes to achieve pasteurization in accordance with 21 C.F.R. §114 et seq. "Acidified Foods." The pH of PP6690 on the day after processing was 3.95.

EXAMPLE 22

This example illustrates pilot plant production of a control pear berry medley composition (PP6688) free of egg yolk.

Single-strength pear puree was added to a kettle equipped with a swept-surface heating capability. The puree was heated to a temperature of 160° F. to 170° F. using the hot water jacket. Hot pear puree, 44.4 lb., was weighed and transferred to a second kettle. Ten pounds of white grape juice concentrate, 10.0 lb. of red raspberry puree, 5.6 lb. of heavy cream, 5.0 lb. of full fat yogurt, 8.0 lb. of medium grain rice flour, 3.0 lb. of fresh whole milk, 0.5 lb. of elderberry juice concentrate, 0.04 lb. of ascorbic acid, and 0.01 lb. of zinc sulfate were added to the pear puree and 7.5 lb. of batch water in the second kettle and mixed into a slurry.

The slurry was passed through a Stephan Microcutter, Model No. MC-12, equipped with a blank ring and transferred to a Koven kettle. After additional mixing, the pH was measured and found to be pH 3.74. The slurry was heated to a temperature of 180° F. to 185° F. by steam injection, adding about 6 lb. of water to the batch via condensation of the steam. The slurry was made to 100 lb. by adding 2.0 lb. of water. The slurry was passed twice through a Stephan Microcutter, Model No. MC-12, equipped with a 0.05-0.10 mm ring, and strained through a 0.033" screen.

The product was filled into 113-gram glass jars at a temperature of 144° F. The jars were then capped and thermally processed in a retort at 212° F. for 30 minutes to achieve 45% pasteurization in accordance with 21 C.F.R. §114 et seq. "Acidified Foods." The pH of PP6688 on the day after processing was 3.69.

EXAMPLE 23

This example illustrates pilot plant production of a DHA-enriched egg yolk composition described as "carrot medley", which contains no added acidulant. This composition, identified as PP6656, was produced in a pilot plant.

Carrot puree is prepared by processing frozen carrots in a Fitzpatrick Comminutor, Model No. FASO-20, operating at slow speed and a temperature of 200° F. to 205° F. (205° F. target) with a ³⁄₁₆" or ¼" screen. The puree is strained by passing it through a Stephan Microcutter, Model No. 100 or 100DII, equipped with a 0.05-0.10 mm ring. The soluble sugar content of such a carrot puree was adjusted to 20° Brix by adding carrot juice concentrate. Sixty pounds of this Brix-adjusted carrot puree were transferred to a Koven Kettle capable of holding 300 lb. of product.

Twelve pounds of DHA-enriched dried egg yolk, 3.0 lb. of medium grain rice flour, and 0.01 lb. of zinc sulfate were stirred into the carrot puree along with 20 lb. of batch water.

The slurry was passed through a Stephan Microcutter, Model No. MC-12, equipped with a blank ring and transferred to a Koven kettle. The slurry was heated to a temperature of 180° F. to 190° F. by steam injection, adding about 5 lb. of water to the batch via condensation of the steam. The slurry was made to 100 lb. by adding 2.0 lb. of water. The slurry was passed twice through a Stephan Microcutter, Model No. MC-12 equipped with a 0.05-0.10 mm ring, and then strained through a 0.033 inch screen.

The product was filled into 113-gram glass jars at a temperature of 138° F. The jars were then capped and thermally processed in a retort at 250° F. for 40 minutes as required by 21 C.F.R. § 113 et seq. "Thermally Processed Low-Acid Foods Packaged in Hermetically Sealed Containers." The pH of PP6656 on the day after processing was 5.49.

EXAMPLE 24

This example illustrates pilot plant production of an egg yolk-free control composition described as "carrot medley." This composition, identified as PP6654, was produced in the pilot plant.

Carrot puree is prepared by processing frozen carrots in a Fitzpatrick Comminutor, Model No. FASO-20, operating at slow speed and a temperature of 200° F. to 205° F. (205° F. target) with a ³⁄₁₆" or ¼" screen. The puree is strained by passing it through a Stephan Microcutter, Model No. 100 or 100DII, equipped with a 0.05-0.10 mm ring. The soluble sugar content of such a carrot puree was adjusted to 20° Brix by adding carrot juice concentrate. Ninety-two pounds of this Brix-adjusted carrot puree were transferred to a Koven Kettle capable of holding 300 lb. of product.

Three pounds of medium grain rice flour and 0.01 lb. of zinc sulfate were stirred into the pea puree. The slurry was passed through a Stephan Microcutter, Model No. MC-12, equipped with a blank ring and transferred to a Koven kettle. The slurry was heated to a temperature of 180° F. to 190° F. by steam injection, adding about 5 lb. of water to the batch via condensation of the steam. The slurry was made to 100 lb. by adding 6 lb. of water. The slurry was passed twice through a Stephan Microcutter, Model No. MC-12 equipped with a 0.05-0.10 mm ring, and then strained through a 0.033" screen.

The product was filled into 113-gram glass jars at a temperature of 110° F. The jars were then capped and thermally processed in a retort at 250° F. for 40 minutes as required by 21 C.F.R. § 113 et seq. "Thermally Processed Low-Acid Foods Packaged in Hermetically Sealed Containers." The pH of PP6654 on the day after processing was 5.04.

EXAMPLE 25

This example illustrates pilot plant production of a DHA-enriched egg yolk composition described as "sweet pea medley", which contained no added acidulant. This composition, identified as PP6673, was produced in a pilot plant.

Pea puree was prepared by processing frozen peas in a Fitzpatrick Comminutor, Model No. FASO-20, operating at slow speed and a temperature of 200° F. to 205° F. (205° F. target) with a ³⁄₁₆" or ¼" screen. The puree was strained by passing it through a Stephan Microcutter, Model No. 100 or 100DII, equipped with a 0.05-0.10 mm ring. Sixty-two pounds of such a pea puree were transferred to a Koven Kettle capable of holding 300 lb. of product.

Twelve pounds of DHA-enriched dried egg yolk, 1 lb. of medium grain rice flour, and 0.01 lb. of zinc sulfate were stirred into the pea puree along with 20 lb. of batch water.

The slurry was passed through a Stephan Microcutter, Model No. MC-12, equipped with a blank ring, and transferred to a Koven kettle. The slurry was heated to a temperature of 190° F. by steam injection, adding about 3 lb. of water to the batch via condensation of the steam. The slurry was made to 100 lb. by adding 1.8 lb. of water. The slurry was passed twice through a Stephan Microcutter, Model No. MC-12 equipped with a 0.05-0.10 rrimnng, and then strained through a 0.033 inch screen.

The product was filled into 113-gram glass jars at a temperature of 138° F. The jars were then capped and thermally processed in a retort at 250° F. for 40 minutes as required by 21 C.F.R. § 113 et seq. "Thermally Processed Low-Acid Foods Packaged in Hermetically Sealed Containers." The pH of PP6673 on the day after processing was 6.03.

EXAMPLE 26

This example illustrates pilot plant production of an egg yolk-free control composition of "sweet pea medley." This composition, identified as PP6671, was produced in the pilot plant.

Pea puree was prepared by processing frozen peas in a Fitzpatrick Comminutor, Model No. FASO-20, operating at slow speed and a temperature of 200° F. to 205° F. (205° F. target) with a 3/16" or 1/4" screen. The puree was strained by passing it through a Stephan Microcutter, Model No. 100 or 100DII, equipped with a 0.05-0.10 mm ring. Ninety-four pounds of such a pea puree were transferred to a Koven Kettle capable of holding 300 lb. of product.

One pound of medium grain rice flour and 0.01 lb. of zinc sulfate were stirred into the pea puree. The slurry was passed through a Stephan Microcutter, Model No. MC-12, equipped with a blank ring, and transferred to a Koven kettle. The slurry was heated to a temperature of 190° F. by steam injection, adding about 5 lb. of water to the batch via condensation of the steam. The slurry weighed 100 lb. The slurry was passed twice through a Stephan Microcutter, Model No. MC-12 equipped with a 0.05-0.10 mm ring, and then strained through a 0.033" screen.

The product was filled into 113-gram glass jars at a temperature of 143° F. The jars were then capped and thermally processed in a retort at 250° F. for 40 minutes as required by 21 C.F.R. § 113 et seq. "Thermally Processed Low-Acid Foods Packaged in Hermetically Sealed Containers." The pH of PP6671 on the day after processing was 5.83.

EXAMPLE 27

This example illustrates the effects on visual function of feeding semi-solid baby food comprising DHA-enriched egg yolk to healthy, breast fed term infants.

Healthy breast-feeding infants six months of age were randomly divided into two groups. One group received control baby foods and the other received baby foods containing DHA-enriched egg yolk. Breast feeding was continued in both groups for approximately three months after introduction of the baby foods into the infants' diets. Fifty-one breast-fed infants completed the study: 26 infants in the group received the control baby food and 25 infants in the group received the baby foods made with DHA-enriched egg yolks.

Semi-solid baby foods containing DHA-enriched egg yolk and control baby foods were prepared as described in Examples 17-26. Infants in the DHA group were fed baby foods prepared from DHA-enriched eggs (see Examples 17, 19, 21, 23 and 25). The amount of DHA-enriched egg yolk in these foods was sufficient to provide 110 mg of DHA per 100 grams of food. Each glass jar contained 4 ounces (113 grams) of food. Consequently, each jar of baby food made with DHA-enriched egg yolk contained about 125 mg of DHA. The control baby foods contained neither egg yolk and nor DHA.

The infants were first fed study foods at approximately 26 weeks of age (6 months) and continued to be fed each day until they reached 52 weeks of age (1 year). Breast feeding continued during this six month period, an average of $3.7 \pm 2.2$ (mean±S.D.) months in the control group and $2.8 \pm 2.4$ (mean±S.D.) months in the DHA group, respectively. Parents were provided with semi-solid baby foods prepared as described in Examples 17-26. Infants in the DHA group were fed baby foods prepared from DHA-enriched egg yolks (see Examples 17, 19, 21, 23 and 25). Infants in control group received similar baby foods that were, however, made without any egg yolks (see Examples 18, 20, 22, 24 and 26). The DHA-enriched baby foods contained approximately 115 mg DHA per 100 grams of food (i.e., about 130 mg DHA/113 g baby food jar). Parents were given a target of providing 1 jar per day of study baby food to their infant. Compliance was estimated from food intake estimated for the first two months of the trial by collecting and weighing the opened jars to determine the amount of food that was not consumed and from red blood cell fatty acid content. The gravimetric measure indicated that the group of breast-fed infants receiving the baby foods made with DHA-enriched egg yolks consumed an average of $72 \pm 31$ (mean±S.D.) g baby food/day. Infants receiving the baby foods made with DHA-enriched egg yolks consumed an average of 78 mg DHA/day, with a one-standard deviation range of 47 to 118 mg/day of supplementary DHA.

Red blood cell fatty acids were measured at enrollment at 26 weeks and at the end of the study at 52 weeks. As shown in Table 11, the breast-fed infants receiving the control baby foods had an average red blood cell DHA level at 52 weeks of 3.00% of total fatty acids (std. dev.=1.26%) compared to an average of 5.50% (std. dev.=1.67%) for the breast-fed infants receiving the baby foods made with DHA-enriched egg yolks. This 83% higher red blood cell DHA level of the infants receiving baby foods made with DHA-enriched egg yolks was statistically significant (P<0.0005).

TABLE 11

| Baby food fed to breast-fed infants from 26 to 52 weeks | Number of infants per group | Red blood cell DHA level, % of total fatty acids, at 52 weeks of age | Statistical significance |
|---|---|---|---|
| Control | 26 | 3.00 ± 1.26 | P < 0.0005 |
| DHA-egg yolk | 25 | 5.50 ± 1.67 | |

Anthropometric measures, specifically body weight, body length, head circumference, and sub-scapular and triceps fat-fold thickness, were monitored at birth, 26 weeks, 39 weeks and at one year of age. Total antioxidant capacity and basic blood element profiles (i.e., complete blood count, hematocrit, and platelets) were measured at 26 weeks and at the end of the study (52 weeks).

Visual development was assessed by measuring sweep visual-evoked potential (VEP) acuity (Hoffman et al., 2003, supra; Birch et al., 2002, supra; Norcia, *Vision Res* 25: 1399-1408, 1985; Neuringer, *Am. J. Clin. Nutrition* 71:256S-267S, 2000). Measurements were made at 26, 39, and 52 weeks of age. Sweep VEP acuity at these ages in infants is an index of the maturation of the retina and visual cortex. As shown in Table 12, VEP acuity at 26 weeks was 0.49 logMAR (logarithm of minutes of arc resolution) and improved to 0.45 logMAR at 39 weeks and to 0.29 logMAR at 52 weeks in the breast-fed infants receiving the control baby foods. In the infants receiving the baby foods made with DHA-enriched egg yolks, VEP acuity was 0.48 logMAR at 26 weeks and improved to 0.31 logMAR at 39 weeks and to 0.14 logMAR at 52 weeks. Compared to the infants receiving the control baby foods, the infants receiving the baby foods made with DHA-enriched egg yolks had improved visual acuity of 0.14 logMAR at 39 weeks (P<0.001) and at 52 weeks of age (P<0.0005). The VEP acuity differences at 39 weeks and 52 weeks, 0.14 logMAR, represent 1.5 lines on the eye chart.

VEP acuity at one year was correlated with red blood cell DHA levels at one year (r=−0.38; p=0.006).

TABLE 12

| baby food fed to breast fed infants from 26 to 52 weeks | Number of infants per group | Sweep visual-evoked potential (VEP) acuity (logarithm of minutes of arc resolution) | | |
|---|---|---|---|---|
| | | 26 weeks | 39 weeks | 52 weeks |
| Control | 26 | 0.49 | 0.45 | 0.29 ± 0.12 |
| DHA-egg yolk | 25 | 0.48 | 0.31 | 0.14 ± 0.13 |
| Statistical significance | | n.s. | P < 0.001 | P < 0.0005 |

Thus, visual function is improved in healthy, breast-fed term infants that are fed semi-solid baby-food compositions containing DHA.

EXAMPLE 28

This example illustrates the effects on cognitive function of feeding semi-solid baby food comprising DHA-enriched egg yolk to healthy, breast fed term infants at the age of 9 months.

Cognitive development was assessed in infants 9 months of age by conducting means-ends problem solving tests on the healthy breast-fed infants described in Example 27. The infants were subjected to problem solving tests based upon protocols developed by P. Willatts (Willatts, *Dev. Psych.* 20: 389-396, 1984; Willatts, *Infant Behav. Dev.* 7: 25-34, 1984; Willatts, *Dev. Psych.* 35: 651-667, 1999). The tests measured an infant's ability to recall the location of a hidden toy, and plan and execute a sequence of actions to retrieve it. First an adult placed a toy upon a first cloth and moved both objects back away from an infant. The infant was required to pull the cloth, and then grasp the toy. Next the adult put the toy close to the child and placed a second cloth over the toy. The infant was required to remove the cloth and grasp the toy. If the infant failed to perform these pre-test tasks, the trial was terminated. For the scored test, the adult placed the toy on the first cloth, covered the toy with the second cloth, and then moved all these objects back away from the infant. The behavior of the infant was then observed to determine his or her ability to focus and complete the task; i.e., to reach out and grab the first cloth, to pull it together with the toy and second cloth towards himself or herself, to lift the second cloth, and to grasp the toy. Each infant was given three such scored trials. Each trial was scored on a scale from −1 to 12 by one or more skilled observers, based upon the infant's ability to focus and complete the task.

As shown in Table 13, in the group of 9-month-old infants receiving control baby-food, the average score on successful trials was 6.31; 11 of 26 (42%) had no successful trials. In comparison, in the group of 9-month-old infants receiving the baby foods made with DHA-enriched egg yolks, the average score on successful trials was 9.57; only 4 of 25 (16%) had no successful trials. The average score of 9.57 from infants fed DHA in an amount of at least about 50 mg DHA/100 grams represents a 52% increase over the average score of 6.31 from infants receiving fed a semi-solid baby food composition that contains less than about 5 mg DHA/100 grams composition (P=0.03, t-test). Statistical analysis of the proportions of infants with no successful trials data using the Mann-Whitney test indicated P<0.02.

TABLE 13

| Baby food fed to breast-fed infants from 26 to 52 weeks | Number of infants per group | Results of two-step problem solving test at 9 months of age | |
|---|---|---|---|
| | | Average Score on successful trials | Proportion with NO successful trials |
| Control | 26 | 6.31 ± 5.82 (Mean ± std. dev.) | 11 of 26 (42%) |
| DHA-egg yolk | 25 | 9.57 ± 4.45 (Mean ± std. dev.) | 4 of 25 (16%) |
| Statistical significance | | P = 0.03 (t-test) | P < 0.02 (Mann-Whitney test) |

EXAMPLE 29

This example illustrates the effects on cognitive function of feeding semi-solid baby food comprising DHA-enriched egg yolk to healthy, breast fed term infants at the age of 18 months.

Infants described in Examples 27 and 28, upon reaching 18 months of age were assessed for cognitive function according to the Bayley neurodevelopmental scales (Bayley, N. *The Bayley Scales of Infant Development II*. New York: New York Psychological Corp., 1993). In these assessments, the mental development index (MDI) was determined for each infant. In the group of 18-month-old infants who had received the control baby foods, the average MDI score was 103.5±1.9, whereas in the group of 18-month-old infants who had received the baby foods made with DHA-enriched egg yolks, the average MDI score was 107.6±3.7 (p=0.29), an increase of MDI score of about 4%.

These data indicate that an increase in cognitive ability can result from feeding semi-solid baby food comprising DHA-enriched egg yolk to healthy, breast fed term infants, and that this increase correlates with an increase in DHA levels in red blood cells in these infants.

In view of the above, it will be seen that the several advantages of the invention are achieved and other advantageous results attained. As various changes could be made in the above methods and compositions without departing from the scope of the invention, it is intended that all matter contained in the above description shall be interpreted as illustrative and not in a limiting sense.

All references cited above in this specification are hereby incorporated by reference in their entireties. This application also incorporates by reference in their entireties U.S. Patent Application Publication US 2004/0091599 published May 13, 2004; U.S. Patent Application Publication 2003/0207004 published Nov. 6, 2003; U.S. Pat. No. 6,579,551 issued Jun. 17, 2003; and U.S. Pat. No. 6,149,964 issued Nov. 21, 2000. All of the aforementioned applications and patents are incorporated herein in their entireties by reference. Any discussion of references cited herein is intended merely to summarize the assertions made by their authors and no admission is made that any reference or portion thereof constitutes relevant prior art. Applicants reserve the right to challenge the accuracy and pertinency of the cited references.

What is claimed is:

1. A method for improving cognitive ability in an infant, the method comprising feeding the infant a shelf-stable semi-solid baby-food composition comprising DHA in an amount of at least about 50 mg DHA/100 grams of composition in an acceptable baby-food preparation for which (a) appearance and color, (b) flavor, and (c) mouthfeel and texture scores on a nine-point hedonic scale are each greater than five, wherein cognitive ability is improved in infants fed the composition comprising DHA in an amount of at least about 50 mg DHA/ 100 grams of composition in comparison to cognitive ability in infants fed a semi-solid baby food composition containing less than about 5 mg DHA/100 grams of composition.

2. The method according to claim 1, wherein feeding the infant the composition comprises feeding the infant an amount of the composition sufficient to provide at least about 45 milligrams of DHA in a day.

3. The method according to claim 1, wherein feeding the infant the composition comprises feeding the infant at least about 50 grams of the composition in a day.

4. The method according to claim 3, wherein feeding the infant at least about 50 grams of the composition in a day comprises feeding the infant at least about 100 grams of the composition in a day.

5. The method according to claim 1, wherein the composition comprising DHA in an amount of at least about 50 mg DHA/100 grams of composition comprises DHA in an amount of at least about 100 mg DHA/100 grams of composition.

6. The method according to claim 5, wherein feeding the infant the composition comprises feeding the infant at least about 50 grams of the composition in a day.

7. The method according to claim 6, wherein feeding the infant at least about 50 grams of the composition in a day comprises feeding the infant at least about 100 grams of the composition in a day.

8. The method according to claim 1, wherein feeding the infant the shelf-stable semi-solid baby-food composition comprises feeding the infant the composition from the age of about 6 months.

9. The method according to claim 1, wherein feeding an infant the composition comprises feeding the infant the composition until the age of about 9 months.

10. The method according to claim 1, wherein feeding an infant the composition comprises feeding the infant the composition until the age of about one year.

11. The method according to claim 1, wherein the cognitive ability is improved as measured by improvement of at least about 10% in average scores in a means-ends problem solving test in infants fed the shelf-stable semi-solid baby-food composition comprising DHA in comparison to cognitive ability in control infants fed a semi-solid baby food composition containing less than about 5 mg DHA/100 grams composition.

12. The method according to claim 11, wherein the improvement of at least about 10% in average scores in a means-ends problem solving test comprises improvement of at least about 10% in average scores in a means-ends problem solving test measured at the age of about 9 months.

13. The method according to claim 1, wherein the cognitive ability is improved as measured by improvement of at least about 30% in average scores in a means-ends problem solving test in infants fed the shelf-stable semi-solid baby-food composition comprising DHA in comparison to cognitive ability in control infants fed a semi-solid baby food composition containing less than about 5 mg DHA/100 grams of composition.

14. The method according to claim 1, wherein the cognitive ability is improved as measured by improvement in average mental development index scores of at least about 1% in infants fed the shelf-stable semi-solid baby-food composition comprising DHA in comparison to cognitive ability in infants fed a semi-solid baby food composition containing less than about 5 mg DHA/100 grams of composition.

15. The method according to claim 14, wherein the infants fed the composition comprising DHA are infants fed the composition until the age of about one year.

16. The method according to claim 14, wherein the average mental development index scores are average mental development index scores determined at the age of about 18 months.

17. The method according to claim 1, wherein the improving cognitive ability comprises improving average mental development index scores by at least about 3% in infants fed the shelf-stable semi-solid baby-food composition comprising DHA in comparison to cognitive ability in infants fed a semi-solid baby food composition containing less than about 5 mg DHA/100 grams of composition.

18. The method according to claim 17, wherein the infants fed the composition comprising DHA are infants fed the composition until the age of about one year.

19. The method according to claim 18, wherein the average mental development index scores are average mental development index scores determined at the age of about 18 months.

20. The method according to claim 1, wherein the baby-food composition comprises coagulated egg yolk solids in an amount of from at least about 5% to about 25% (grams/100 grams) of the composition.

21. The method according to claim 20, wherein the baby-food composition comprises coagulated egg yolk solids containing DHA in an amount of at least about 9 mg DHA/gram of egg yolk solids.

22. The method according to claim 20, wherein the egg yolk solids comprise about 12% (grams/100 grams) of the composition.

23. A method for improving cognitive ability in an infant, the method comprising providing a semi-solid baby-food composition having a formula selected on the basis of its containing DHA in an amount of at least about 50 mg DHA/100 grams of composition in an acceptable, shelf-stable baby-food preparation for which (a) appearance and color, (b) flavor, and (c) mouthfeel and texture scores on a nine-point hedonic scale are each greater than five; and feeding the semi-solid baby-food composition to an infant, wherein cognitive ability is improved in infants fed the composition, in comparison to cognitive ability in infants fed a semi-solid baby food composition containing less than about 5 mg DHA/ 100 grams of composition.

24. The method according to claim 23, wherein infants fed the composition are infants fed the composition from an age of about 6 months.

25. The method according to claim 23, wherein infants fed the composition are infants fed the composition until the age of about 9 months.

26. The method according to claim 25, wherein cognitive ability is improved in infants fed the semi-solid baby food composition, as evidenced by increased average test scores of at least about 10% in a means-ends problem solving test in infants fed the composition comprising DHA, in comparison to cognitive ability of control infants fed a semi-solid baby food composition containing less than about 5 mg DHA/100 grams of composition.

27. The method according to claim 23, wherein infants fed the composition are infants fed the composition from an age of about 6 months until the age of about 1 year.

28. The method according to claim 27, wherein cognitive ability is improved as evidenced by increased average test scores in an assessment of mental development index of at least about 1% in comparison to cognitive ability in infants fed a semi-solid baby food composition containing less than about 5 mg DHA/100 grams of composition.

29. The method according to claim 23, wherein the DHA-containing baby-food composition comprises coagulated egg yolk solids in an amount of from at least about 5% to about 25% (grams/100 grams) of the composition.

30. The method according to claim 29, wherein the DHA-containing baby-food composition comprises coagulated egg yolk solids containing DHA in an amount of at least about 9 mg DHA/gram of egg yolk solids.

31. The method according to claim 29, wherein the egg yolk solids comprise about 12% (grams/100 grams) of the composition.

32. A method for a providing to a consumer, a baby food that improves cognitive ability in an infant, the method comprising providing a shelf-stable semi-solid baby-food composition having a formula selected on the basis of its containing DHA in an amount of at least about 50 mg DHA/100 grams of composition in an acceptable, shelf-stable baby-food preparation for which (a) appearance and Color, (b) flavor, and (c) mouthfeel and texture scores on a nine-point hedonic scale are each greater than five; and selling the baby-food composition to the consumer, wherein cognitive ability is improved in infants fed the composition in comparison to cognitive ability in infants fed a composition containing less than about 5 mg DHA/100 grains of composition.

33. The method according to claim 32, wherein the DHA-containing baby-food composition containing DHA in an amount of at least about 50 mg DHA/100 grams of composition is a DHA-containing baby-food composition containing DHA in an amount of at least about 100 mg DHA/100 grams of composition.

34. The method according to claim 32, wherein the DHA-containing baby-food composition comprises coagulated egg yolk solids in an amount of from at least about 5% to about 25% (grams/100 grams) of the composition.

35. The method according to claim 34, wherein the DHA-containing baby-food composition comprises coagulated egg yolk solids containing DHA in an amount of at least about 9 mg DHA/gram of egg yolk solids.

36. The method according to claim 35, wherein the egg yolk solids comprise about 12% (grams/100 grams) of the composition.

37. The method according to claim 32, wherein infants fed the shelf-stable semi-solid baby-food composition comprising DHA are infants fed the shelf-stable semi-solid baby-food composition comprising DHA from the age of about 6 months.

38. The method according to claim 32, wherein infants fed the shelf-stable semi-solid baby-food composition comprising DHA are infants fed the shelf-stable semi-solid baby-food composition comprising DHA until the age of about 9 months.

39. The method according to claim 32, wherein infants fed the shelf-stable semi-solid baby-food composition comprising DHA are infants fed the shelf-stable semi-solid baby-food composition comprising DHA until the age of about 1 year.

40. The method according to claim 32, wherein cognitive ability is improved as indicated by an increase in average test scores of at least about 10% in a means-ends problem solving test in infants fed the shelf-stable semi-solid baby-food composition comprising DHA, in comparison to cognitive ability in control infants fed a semi-solid baby food composition containing less than about 5 mg DHA/100 grams of composition.

41. The method according to claim 32, wherein cognitive ability is improved as indicated by an increase in average test scores of at least about 30% in a means-ends problem solving test in infants fed the shelf-stable semi-solid baby-food composition comprising DHA, in comparison to cognitive ability in control infants fed a semi-solid baby food composition containing less than about 5 mg DHA/100 grams of composition.

42. The method according to claim 32, wherein cognitive ability is improved as indicated by an increase in average test scores of at least about 1% in mental development index in infants in comparison to cognitive ability in infants fed a composition containing less than about 5 mg DHA/100 grams of composition.

43. The method of claim 42, wherein average test scores are average test scores of infants of about 18 months of age.

* * * * *